United States Patent
Ganapathi et al.

(10) Patent No.: US 6,578,436 B1
(45) Date of Patent: Jun. 17, 2003

(54) METHOD AND APPARATUS FOR PRESSURE SENSING

(75) Inventors: Srinavasan K. Ganapathi, Fremont, CA (US); Randolph S. Gluck, San Jose, CA (US); Steven H. Hovey, Goleta, CA (US); Shiva Prakash, Santa Barbara, CA (US)

(73) Assignee: Fidelica Microsystems, Inc., Milpitas, CA (US)

( * ) Notice: Subject to any disclaimer, the term of this patent is extended or adjusted under 35 U.S.C. 154(b) by 0 days.

(21) Appl. No.: 09/571,765

(22) Filed: May 16, 2000

(51) Int. Cl.$^7$ ............................................... G01D 7/00

(52) U.S. Cl. ............................................... 73/862.046

(58) Field of Search ................... 73/862.041, 862.042, 73/862.043, 862.044, 862.45, 862.046

(56) References Cited

U.S. PATENT DOCUMENTS

| | | | |
|---|---|---|---|
| 4,547,898 A | 10/1985 | Tsikos | 382/4 |
| 4,559,422 A | 12/1985 | Moronenko et al. | 200/67 |
| 4,570,139 A | 2/1986 | Kroll | 335/187 |
| 4,577,345 A | 3/1986 | Abramov | 382/4 |
| 4,582,985 A | 4/1986 | Lofberg | 235/380 |
| 4,681,403 A | 7/1987 | Te Velde et al. | 350/334 |
| 4,684,770 A | 8/1987 | Pitrat et al. | 200/67 R |
| 4,758,698 A | 7/1988 | Mironenko et al. | 200/67 DB |
| 4,904,832 A | 2/1990 | Nagahara et al. | 200/402 |
| 4,965,415 A | 10/1990 | Young et al. | 200/83 N |
| 5,017,747 A | 5/1991 | Nagahara et al. | 200/453 |
| 5,113,046 A | 5/1992 | Hauk | 200/332 |
| 5,121,089 A | 6/1992 | Larson | 333/107 |
| 5,212,473 A * | 5/1993 | Louis | 345/168 |
| 5,262,000 A | 11/1993 | Welbourn et al. | 156/643 |
| 5,309,006 A | 5/1994 | Willems et al. | 257/275 |
| 5,367,136 A | 11/1994 | Buck | 200/600 |
| 5,374,792 A | 12/1994 | Ghezzo et al. | 200/16 B |
| 5,400,662 A | 3/1995 | Tamori | 73/862.046 |
| 5,429,006 A | 7/1995 | Tamori | 73/862.046 |
| 5,446,251 A | 8/1995 | Lin | 200/284 |
| 5,453,590 A | 9/1995 | Mayer | 200/461 |
| 5,467,068 A | 11/1995 | Field et al. | 335/4 |
| 5,475,353 A | 12/1995 | Roshen et al. | 335/78 |
| 5,489,556 A | 2/1996 | Li et al. | 437/228 |
| 5,503,029 A | 4/1996 | Tamori | 73/862.046 |
| 5,515,738 A * | 5/1996 | Tamori | 73/862.46 |
| 5,526,701 A * | 6/1996 | Tamori | 73/862.046 |
| 5,531,018 A | 7/1996 | Saia et al. | 29/622 |
| 5,554,964 A | 9/1996 | Jansseune | 335/207 |
| 5,558,210 A | 9/1996 | Jonischus | 200/321 |
| 5,623,552 A | 4/1997 | Lane | 382/124 |
| 5,637,904 A | 6/1997 | Zettler | 257/417 |
| 5,638,946 A | 6/1997 | Zavracky | 200/181 |

(List continued on next page.)

FOREIGN PATENT DOCUMENTS

| | | |
|---|---|---|
| DE | 196 48 767 A1 | 6/1997 |
| DE | 196 31 569 A1 | 2/1998 |
| EP | 0459808 | 4/1991 |
| EP | 0 650 139 A1 | 10/1994 |
| EP | 0769754 | 4/1997 |
| GB | 2243235 | 10/1991 |
| WO | WO 97/25798 | 7/1997 |

*Primary Examiner*—Max Noori
(74) *Attorney, Agent, or Firm*—Pillsbury Winthrop LLP

(57) ABSTRACT

The present invention provides a pressure based fingerprint image capture device that includes an array of cantilevers or simply suspended bridges, with each pressure based sensor having a cantilever or a simply suspended bridge in contact with a conducting electrode that deforms under the load applied by the localized ridge on the fingerprint, and which provides contact to another conducting electrode thereby closing the electrical circuit, a switch in the simplest form, and providing a "pulse" response from the sensor. In the quiescent state, each cantilever or simply suspended bridge structure contains an upper electrode which forms one part of the switch, while another conducting layer, the lower electrode at the bottom of the well of the individual sensor, forms the other part of the switch.

95 Claims, 15 Drawing Sheets

U.S. PATENT DOCUMENTS

| | | | |
|---|---|---|---|
| 5,652,559 A | 7/1997 | Saia et al. | 335/78 |
| 5,778,513 A | 7/1998 | Miu et al. | 29/602 |
| 5,810,604 A * | 9/1998 | Kopp, Jr. et al. | 434/317 |
| 5,821,596 A | 10/1998 | Miu et al. | 257/419 |
| 5,828,268 A | 10/1998 | Ando et al. | 330/124 D |
| 5,844,287 A | 12/1998 | Hassan et al. | 257/419 |
| 5,864,296 A * | 1/1999 | Upton | 340/825.3 |
| 5,905,241 A | 5/1999 | Park et al. | 200/409 |
| 5,940,525 A * | 8/1999 | Itsumi | 382/124 |
| 5,946,176 A | 8/1999 | Ghoshal | 361/56 |
| 5,994,796 A | 11/1999 | De Las Santos | 307/113 |
| 6,020,564 A | 2/2000 | Wang et al. | 200/181 |
| 6,034,339 A | 3/2000 | Pinholt et al. | 200/181 |
| 6,037,719 A | 3/2000 | Yap et al. | 315/169.3 |
| 6,067,368 A * | 5/2000 | Setlak et al. | 382/124 |

\* cited by examiner

METHOD AND APPARATUS FOR PRESSURE SENSING

FIELD OF THE INVENTION

The present invention relates to using pressure in conjunction with micromachined beams for the capture of texture images, such as of a fingerprint, and methods of making and using the same.

BACKGROUND OF THE INVENTION

The fingerprint sensing industry uses several different technologies to capture images of an individual's fingerprints. The two most prominent technologies are optical based sensors and capacitance based sensors. Optical sensors use a light source, lenses and a prism to image the "ridges" and valleys on a fingerprint, based on differences in the reflected light from the features. The conventional capacitance sensor uses semiconductor CMOS processing to fabricate a two-dimensional array of capacitors on a silicon chip. The individual sensors on the chip form one plate of the parallel plate capacitor, while the finger itself, when placed on the array, acts as the second plate for the various localized sensors. Upon contact with the array of sensors, the individual distance from each sensor to the corresponding point on the skin above the sensor is measured using capacitive techniques. The difference in distance to skin at the ridges and valleys of a fingerprint provide the means to replicate the fingerprint. An example of the use of capacitive sensors to measure the spacing is shown in FIG. 1A and 1B.

Both the above techniques, as well as other techniques used to capture fingerprint images fundamentally measure the spacing between the fingerprint features and the sensor. The measurement of spacing is inherently subject to several distortion effects: any parameter which affects the spacing between the finger and the sensor will affect the measurement. For example, both capacitive and optical sensors are very sensitive to oils or grease on the finger and to the presence or absence of moisture on the finger. In addition, the ambient temperature affects these sensors at the time of sensing. Under very hot or very cold conditions, the capacitive sensor can provide erroneous readings. Finally, most sensors have abrasion resistant coatings, and the thickness of the protective coating affects the measurement as it adds to the spacing. The combined effect of all these variables results in a very distorted image of the fingerprint, as shown in FIG. 1C. Finally, in the case of silicon chip based fingerprint sensors, the placement of the finger directly on to the silicon greatly increases the risk of electrostatic discharge and damage to the sensor.

As a result of the above drawbacks to spacing based reproduction of fingerprints, it would be very useful to be able to use the difference in pressure exerted by the ridges and valleys of a fingerprint at different locations on a sensor to replicate the fingerprint image. In principle, a pressure based fingerprint sensor would be impervious to the drawbacks listed above, such as wet or dry conditions on the fingertip, presence of oil or grease on the fingertip, thickness of protective coatings, etc; and would produce a "pulse" response, depending on whether each sensor in the array experiences a ridge or a valley. This situation is illustrated in FIG. 1D and 1E, where the pressure sensor can highlight only the ridges, which are the lines of interest in a fingerprint. However, due to a variety of factors, pressure based sensors have not been deployed for the replication of fingerprints.

Accordingly, there remains a need for a device suitable for use as a texture image capture sensor that has high sensitivity, yet can provide high lateral resolution. Moreover, there further remains a need for a sensor that is suitable for use in fingerprint image capture that is less sensitive to adverse conditions such as extreme temperatures and skin oils and grease.

SUMMARY OF THE INVENTION

It is an object of the invention is to provide a pressure-based sensor that is suitable for use in texture identification and/or verification, such as for fingerprints and the like.

Another object of the invention is to provide a pressure-based sensor that is less sensitive to adverse conditions such as extreme temperatures and skin oils and grease.

Another object of the invention is to provide a pressure-based sensor that is less sensitive to transient ESD voltages and mechanical abrasion.

Another object of the invention is to provide a pressure based two dimensional array of sensors for use in texture capturing in which each element of the array can be electrically addressed and polled without the use of active semiconductor devices such as diodes or transistors.

The present invention fulfills these and other objects of the present invention by providing a pressure-based image capture device that includes an array of cantilevers or simply suspended bridges, with each pressure based sensor having a cantilever or a simply suspended bridge in contact with a conducting electrode that deforms under the load applied by the localized ridge of the texture, and which provides contact to another conducting electrode thereby closing the electrical circuit, a switch in the simplest form, and providing a "pulse" response from the sensor. In the quiescent state, each cantilever or simply suspended bridge structure contains an upper electrode which forms one part of the switch, while another conducting layer, the lower electrode at the bottom of the well of the individual sensor, forms the other part of the switch.

In the quiescent state, the cantilever or simply suspended bridge is electrically isolated from the bottom of the well, which is formed by the second electrode. When a texture is applied upon the array of sensors, some sensors fall under the ridges or protrusions on the texture, whereas the rest of the sensors are not in contact with any part of the texture. Such as between adjacent ridges on a fingerprint. Those sensors that are not in contact with any part of the texture continue to be electrically isolated from the lower electrode. However, those sensors that are directly under the ridges or protrusion of the texture deform under the load applied on the individual cantilever or simply suspended bridge, and with adequate deflection, the beam makes contact with the lower electrode, thus closing the electrical circuit.

In a preferred embodiment, each of the individual switches is connected in series with a very large resistance device, preferably a passive resistor, which is connected either to the row or to the column. Further, each of the columns is connected to a column multiplexer and each of the rows is connected to a downstream or row multiplexer. Further, a separate pull-down resistance device, again preferably a passive resistor, is connected from either every row or every column to a lower potential, such as ground, just prior to the connection to the multiplexer of interest. This allows the distinction between the ridges and valleys on a texture. For a fingerprint, all sensor locations where the electrical circuit is closed upon the application of a finger denote the ridges on the fingerprint.

Also, the present invention allows for the use of a membrane instead of a cantilever (also called "beam") or simply suspended bridge. In order to provide a generic descriptor no matter what specific structure is used to hold the upper electrode over a void disposed above the lower electrode; the term "support" will be used.

While the above provides an overview of the invention, there exist numerous other significant aspects and advantages that will become apparent in the discussion provided hereinafter.

BRIEF DESCRIPTION OF THE DRAWINGS

The above and other objectives, features, and advantages of the present invention are further described in the detailed description which follows, with reference to the drawings by way of non-limiting exemplary embodiments of the present invention, wherein like reference numerals represent similar parts of the present invention throughout several views and wherein.

DETAILED DESCRIPTION OF THE PREFERRED EMBODIMENTS

In the preferred embodiment, the sensor comprises a two-dimensional array of cells, each cell being a pressure based "pulse" switch. It should be understood that while the sensor has certain specific advantages when used as a fingerprint sensor as described in the preferred embodiment, that there are also other texture-sensing applications for this sensor, such as arrayed digital accelerometers. Accordingly, the preferred embodiments will be described based upon the application to fingerprint, but it will be understood that the present invention has broader applications in sensing textures other than fingerprints.

The cells comprising the switches are spaced from each other by an appropriate distance that is a fraction of the inter-ridge spacing of the fingerprint. The preferable range of this fraction is ½–1/20. Each switch comprises an upper electrode made of a conductor attached to a beam, which is either a cantilever beam that has one end free, or a fixed end bridge in which both ends of the bridge are fixed, and separated from and suspended over a lower conducting electrode.

An orthogonal grid of metallic leads, electrically isolated from each other, serve as the electrical input and output lines for each switch. The orthogonal grid of metallic leads are essentially rows and columns of conductors which lead into and out of each switch. Each row/column combination of conducting leads corresponds uniquely to a specific switch in the array, which switch can therefore be addressed by applying a voltage and sensing a current between those two corresponding conducting leads.

Figure 1A:
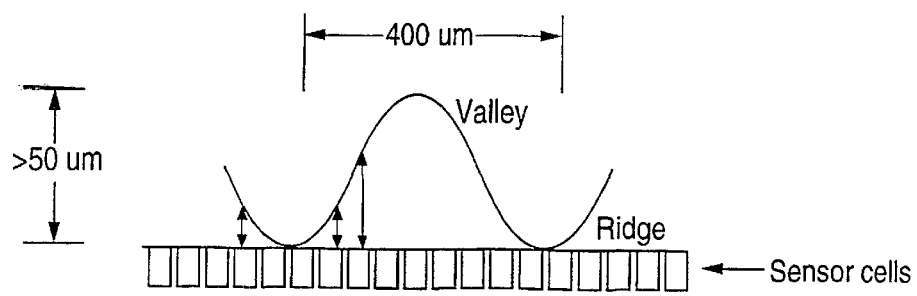
FIGS. 1A–1C are side views of a fingertip on a prior art capacitive sensor, which illustrate the use of spacing for replicating the fingerprint, and the distortion associated with the prior art.
Figure 1B:
Figure 1C:
Figure 1D:
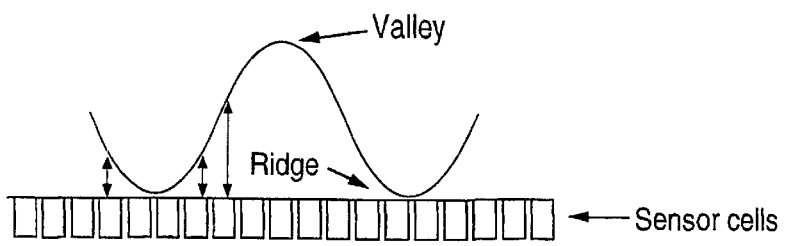
FIGS. 1D–1E are an illustration of a method for replicating a fingerprint according to the present invention and which illustrate the pulse response from the sensor
Figure 1E:

The lower conducting electrode of each switch is electrically connected to the column (or row) leads, and the upper conducting electrode is electrically connected to the row (or column) leads. Since the row and column conductor leads are electrically isolated from each other, the switch is electrically "open" in the quiescent state, and no current passes from the row to the column. When a fingerprint is placed on the sensor, the upper electrodes of certain cells are in direct contact with the ridges of the fingerprint, while the rest of the electrodes are not in contact, as shown in FIG. 1D. With appropriate design and fabrication of the beam or upper electrode, it can be made to deflect downwards and establish contact with the lower electrode when a ridge of a fingerprint is applied thereto, and then revert to its original position when the ridge of the fingerprint is removed. Therefore, if a cell in the array resides directly beneath a ridge of the fingerprint, it will be deflected and the switch will be closed, but if the switch resides beneath a valley of the fingerprint, then it will not be deflected and the switch will remain open.

A large resistance device, preferably a passive resistor in the range of 5,000 ohms to 500,000 ohms, but which can also be a simple p-n diode with low forward resistance and low leakage current characteristics or field effect transistor or thin film transistor or any other type of transistor with similar characteristics, is preferably placed in series with each switch in the array so that one can easily distinguish between an open and a closed switch while polling each cell upon application of the fingerprint. An electrical circuit such as a conventional counter, shift register and operational amplifier attached to a multiplexer, combined with voltage sources and current/voltage detectors can be used to detect the output current or voltage from the row/column being addressed, and one can use the magnitude of this current to provide an indication of whether that particular switch is closed or open. In this way each switch can be polled individually using the multiplexer and simple controlling electronics and software and a map of the closed switches can be acquired. This map essentially represents a map of the fingerprint image, since the image is just the reproduction of the ridges on the fingerprint.

Beam Design Considerations

Typically, the load applied by an individual's finger on a sensor is in the range of 100–500 grams. In addition, the fingerprint is approximately 15 mm×15 mm in dimensions; so an array of sensors with total dimensions of 15 mm×15 mm is appropriate. The spacing between the ridges is on the order of 400 $\mu$m. If the sensors are assumed to be placed 50 $\mu$m apart on a two dimensional x-y grid, this requires an array of 300×300 sensors, amounting to a total sensor dimension of 15 mm×15 mm. There are therefore a total of 90000 sensors in this array, and the applied load from the fingertip can be assumed to be distributed over these 90000 sensors. As a first order approximation, one can assume that the area of the ridges is equal to that of the valleys, as a result of which approximately 45000 sensors will bear the applied load from the fingerprint. If one conservatively assumes an applied load of 90 grams from the fingerprint, then each cell or beam bears an approximate load of about 2 mg.

The problem is thus reduced to designing a beam that deflects adequately under the application of 2 mg of load to establish contact with a lower electrode and then reverts to its original position when the load is removed. The preferred embodiment is a cantilever beam with the applied load on the beam being concentrated at the end of the beam. The deflection of the tip of a cantilever beam under an applied load at the end of the cantilever beam is given by the equation $$:\delta = \frac{417 q L^4}{512 E b h^3}$$

where $\delta$ is the deflection, q is the load per unit length along the beam, L is the beam length, E is Young's Modulus for the beam material, b is the beam width, and h is the beam thickness. This equation applies to a cantilever beam with a load distributed evenly over the end fourth of the beam. Since the beam needs to fit within the cell dimensions of a maximum of 50 $\mu$m×50 $\mu$m, the length and width of the beam need to be a fraction of the cell pitch in the array. Some typical values of the parameters in Equation 1 are q=1960 dynes/cm L=25 $\mu$m=2.5×10$^{-3}$ cm b=20 $\mu$m=2.0×10$^{-3}$ cm h=0.7 $\mu$m=7.0×10$^{-5}$ cm E=7.5×10$^{11}$ dynes/cm$^2$ which yields a deflection of 1.2 $\mu$m. Therefore, if the quiescent state separation of the upper and lower electrode is made to be a little smaller than the deflection of the beam, one can ensure that the upper electrode will make contact with the lower electrode even for small pressures, and allow detection of a fingerprint ridge. However, the separation between the beam and the lower electrode must be large enough to ensure that any curvature that might arise in the beam due to processing induced stresses will not result in the switch being always closed.

The switch itself is described as follows: The leads in the orthogonal grid are made of a highly conductive material that can be easily patterned using known photolithography and etching techniques. The leads are electrically isolated from each other and from all other structures by thin films of insulating material. Vias (or passages) through the insulating material are provided to allow electrical contact to the upper and lower electrodes from the conducting leads. The upper and lower electrodes are made of a material that is resistant to corrosion and oxidation and has a relatively high conductivity. Gold is a good choice of material for both the bottom and upper electrodes, and is easily photolithographically patterned via well known electroplating processes. The lower electrode is either a part of or is connected to the corresponding conducting lead and resides at the bottom of a well or cavity formed of insulating material over which a cantilever beam is constructed. The upper electrode is situated at the end of the cantilever beam and extends below the beam, making it the lowest point on the underside of the beam assembly. A "button" is also located at the end of the cantilever beam, and extends above the surface of the cantilever beam, making it the highest point in the beam assembly even when the beam is fully deflected. The end of the beam is thus encapsulated between the button and the upper electrode, thus improving the adhesion between the beam and the upper electrode. Since the buttons are designed to be the highest points on the cantilevers, and therefore on the surface of the two dimensional fingerprint sensor array, the ridges of the fingerprint rest on the buttons of the different switches that fall under the ridges. Therefore, the top button also serves to concentrate the applied load from the fingertip at the end of the cantilever beam, which maximizes the deflection of the cantilever beam for a given applied load. The button is also made of a material which is resistant to corrosion and oxidation, and which can be made to adhere well to the upper electrode. Gold serves as a good material for the button as well, although several other material candidates exist. The upper electrode is electrically connected to the corresponding conducting lead by a thin metallic strap of relatively large resistance. If the lower electrode is electrically connected to the column conducting lead, then the metallic strap is electrically connected to the row conducting lead or vice versa. The cantilever beam is constructed using a material with known elastic modulus and fracture stress. It is important to choose the material and the dimensions such that the beam will not fracture under repeated deflections under the application of a fingerprint. Aluminum oxide, Silicon Dioxide, Silicon Nitride, or a metallic film, or a polymer film may serve as the cantilever beam material if all the mechanical properties are known and appropriate dimensions can be achieved.

The pressure based fingerprint or other type of texture sensor using the cantilever beam design as described above, which is the preferred embodiment, provides several advantages over the prior art.

First, one can obtain a large deflection for a relatively small applied force with an appropriate beam design.

Second, this design allows enhanced reliability and is relatively insensitive to the degree of pressure used by the individual. Since the beam is designed for the minimum applied force, it can detect very small pressures by closing the electrical switch even at very small applied loads. However, since the lower electrode is spaced close to the upper electrode, excessive application of force to the upper electrode does not create the danger of beam fracture, since excessive deflection of the upper electrode is arrested by contact with the lower electrode.

Third, the preferred embodiment also allows for processing simplicity, with passive addressing of the different cells using conductive leads and thin film resistors that are isolated from each other. This minimizes and sometimes eliminates the need to use transistors to address the different cells using expensive CMOS processes.

Fourth, the design of the switch is such that it is relatively insensitive to electro-static discharge or other voltage spikes that would otherwise damage silicon based sensors.

Fifth, the power consumption of this device is very low, since only a small current is required to test for the continuity of the electrical circuit when the finger is placed on it. Additionally, the device is only on when a fingerprint is being acquired, minimizing the drain on the energy source. This is extremely useful for portable devices such as cellular phones and laptop computers. In its quiescent state, the device draws no current.

Sixth, the device can be made with materials having high corrosion and abrasion resistance, since it is relatively insensitive to the choice of materials.

Seventh, the device can be made very inexpensively since it does not involve expensive processing of silicon wafers. This fact also allows for the process to be transferred to large area substrates, which yields more sensors per processed wafer, thus decreasing the manufacturing cost.

Switch Fabrication Process

Figure 2:
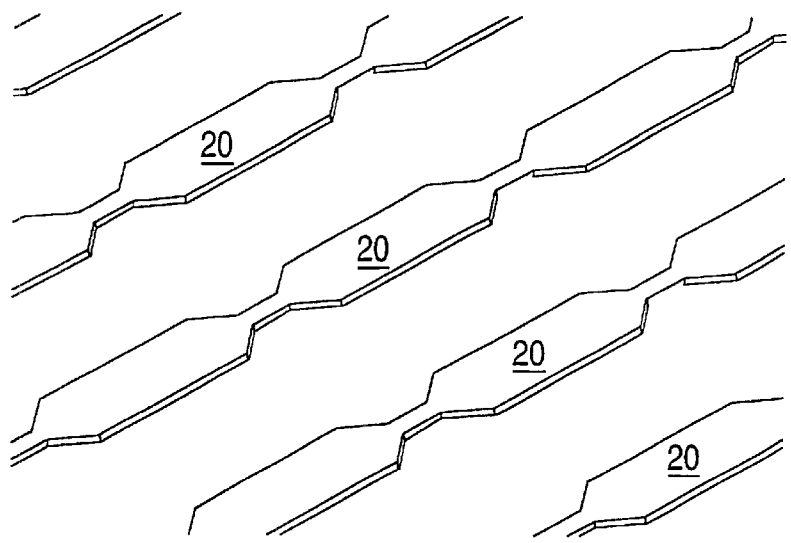
FIG. 2 is a perspective view of the row leads.
Figure 3:
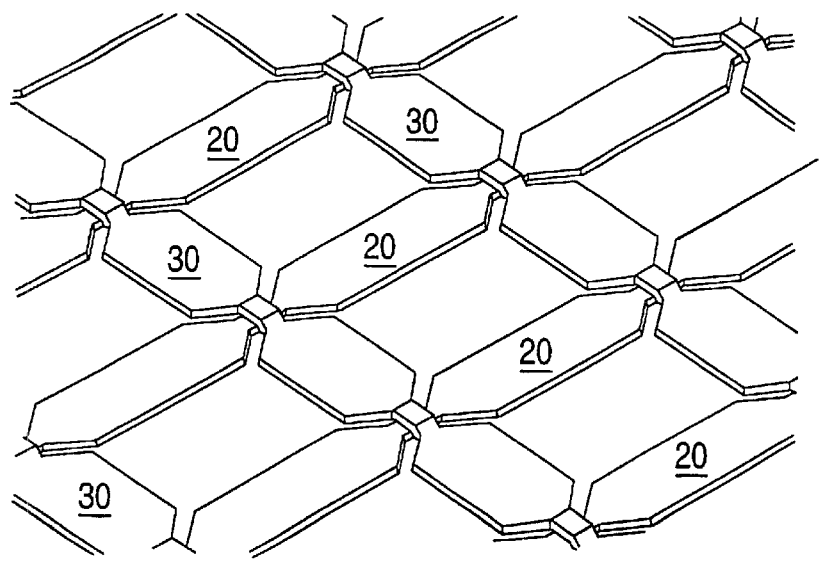
FIG. 3 is a perspective view of the column leads. There is an insulating layer between the row and column leads that electrically isolates them from each other.
Figure 4:
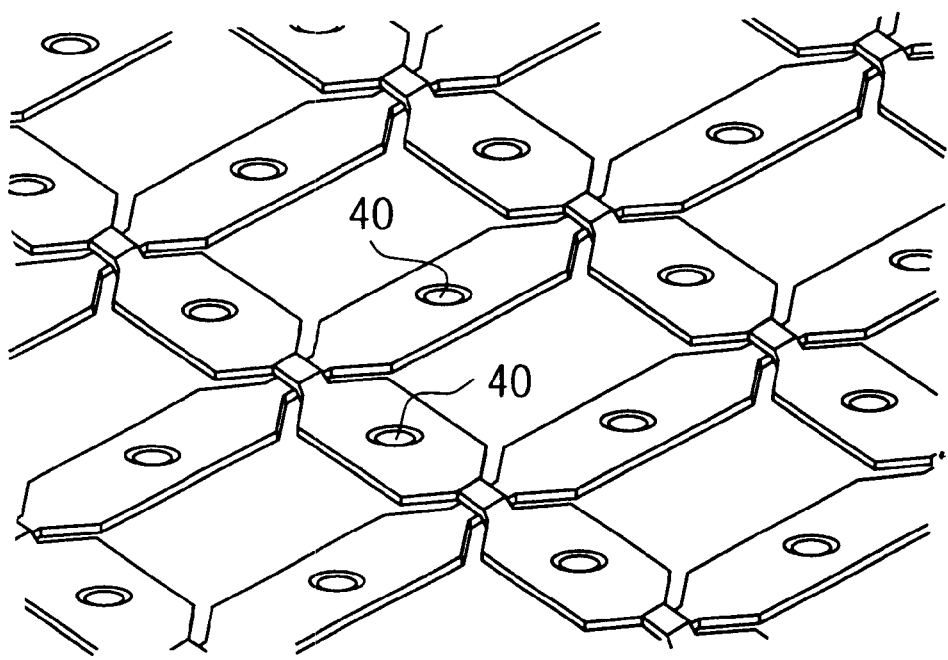
FIG. 4 is a perspective view of the vias or passages that are etched in the insulating material that overlies the column and row leads, and which provides a means of electrically connecting to the leads during subsequent process steps.

The process used in the construction of the pulse switch design is as follows: A flat substrate 12 with an insulating layer 14 on top serves as the starting material. Thus, the present invention thus provides an integrated circuit that integrated circuit that can be built on various types of substrate 12, including but not limited to silicon, aluminum oxide and glass. The insulator layer 14 can include, but is not limited to, silicon dioxide, silicon oxinitride or aluminum oxide (sputtered or applied using other methods). The row leads 20 are first deposited with a conductive material and patterned using ion milling, chemical etching, or a photolithographic liftoff stencil during deposition, as shown in FIG. 2. Alternatively, the conducting leads can also be electroplated in the required pattern. An insulating layer 22 (shown in FIG. 5A) is deposited on top of the row leads, and the column leads 30 are then similarly defined on top of the insulating layer, as shown in FIG. 3. Another insulating layer 32 (also shown in FIG. 5A) is then deposited on top of the column leads. Vias 40 are photolithographically patterned and etched into these insulating layers 22 and 32, with conducting materials deposited therein as is known, as shown in FIG. 4, to provide for electrical contact to the leads.

Figure 5A:
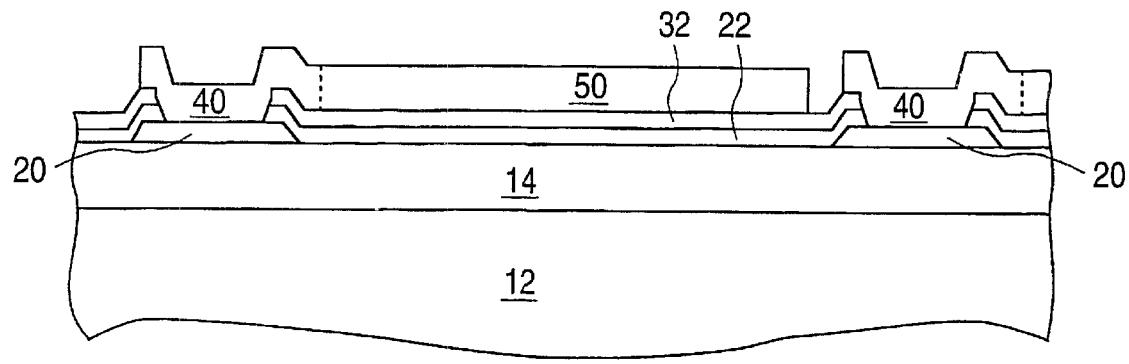
FIG. 5A is a cross section view of the lower electrode connected through a passage to a lead.
Figure 5B:
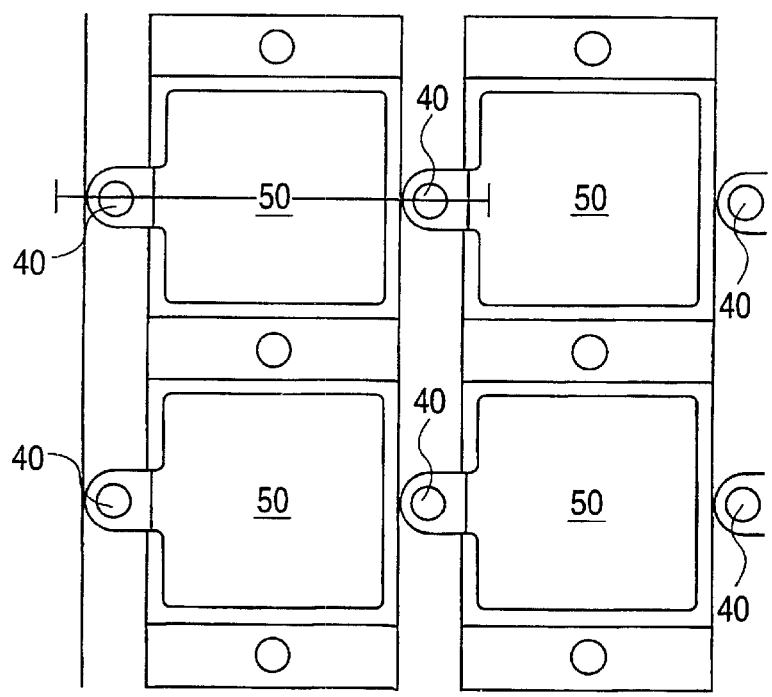
FIG. 5B is a plan view of the lower electrode connected through a passage to a lead, and shows the general shape of the bottom electrode.
Figure 6A:
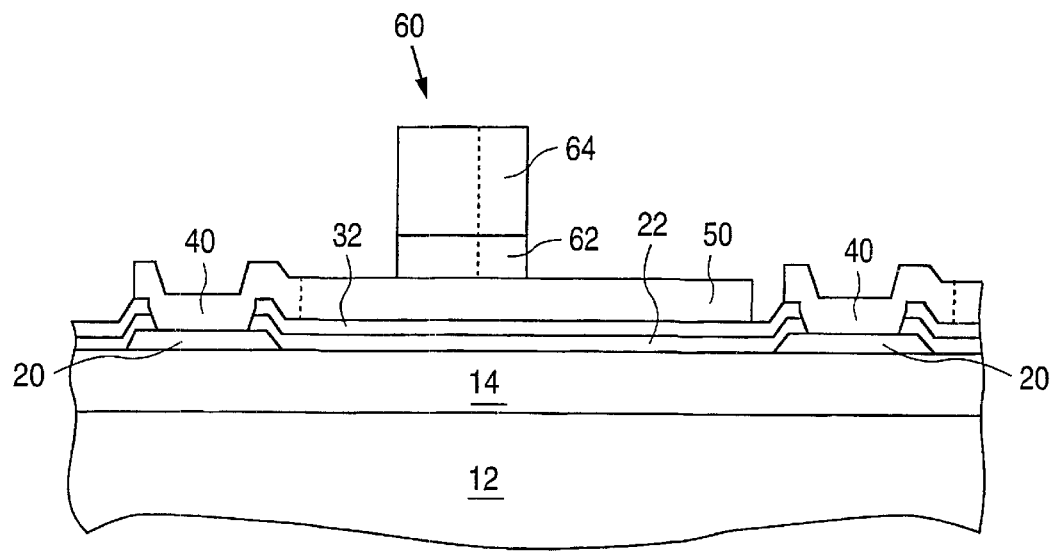
FIG. 6A is a cross section view of the upper electrode of the pulse switch positioned above the lower electrode. This view shows the laminated structure of the upper electrode.
Figure 6B:
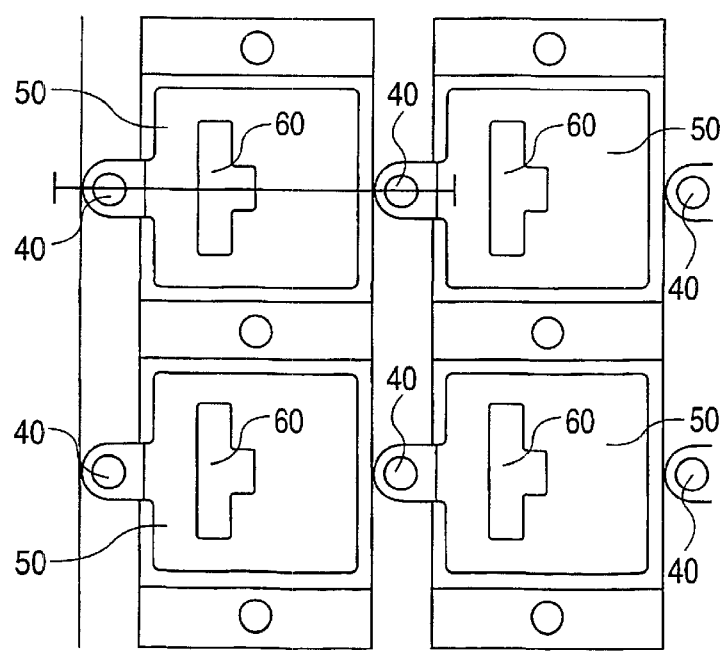
FIG. 6B is a plan view of the upper electrode, and shows the general shape of the feature.

Following the establishment of the orthogonal array of leads, a lower conducting electrode 50 is photolithographically patterned and electroplated as shown in FIG. 5a and 5b. This lower electrode 50 is electrically connected to either the row or column leads and one electrode is electroplated in each cell. This structure ultimately forms one half of a conducting switch. The material for the lower conducting electrode is preferably a metal or alloy that is resistant to corrosion, abrasion and excessive frictional force. Gold or an alloy of gold can be a good choice of material for the lower electrode. The thickness of the lower electrode can be over a wide range of 0.001–10 $\mu$m, although, preferably, it should be greater than 0.25 $\mu$m to guard against wear. Next, the laminated upper electrode structure 60 is photolithographically patterned and electroplated. This structure is electroplated on top of the lower electrode as shown in FIG. 6a and 6b. The lamination comprises a lower sacrificial layer 62 that can be etched selectively from the upper layer 64. The upper layer 64 of this laminated upper electrode structure 60 ultimately forms the other half of the aforementioned switch. The purpose of the lamination is to ensure that the separation between the upper electrode 60 and lower electrode 50 can be established through a release step later in the process, and also to accurately control the separation between the upper electrode 60 and lower electrode 50. The thickness of the lower layer 62 of the laminated structure defines the electrode separation and must be designed in concert with the design of the beam 100, illustrated in FIGS. 10 and 11 and described hereinafter. The thickness of this layer can range from 0.25 $\mu$m to 10.0 $\mu$m depending on the material used in the beam, the beam's geometry, and the specific application of the texture sensor. For the preferred embodiment whose design considerations are listed above, the thickness of the lower sacrificial layer 62 is about 1 $\mu$m. The thickness of the upper layer 64 of the laminated upper electrode is in the range of 0.1–10 $\mu$m, and is preferably about 2.5 microns.

Figure 7A:
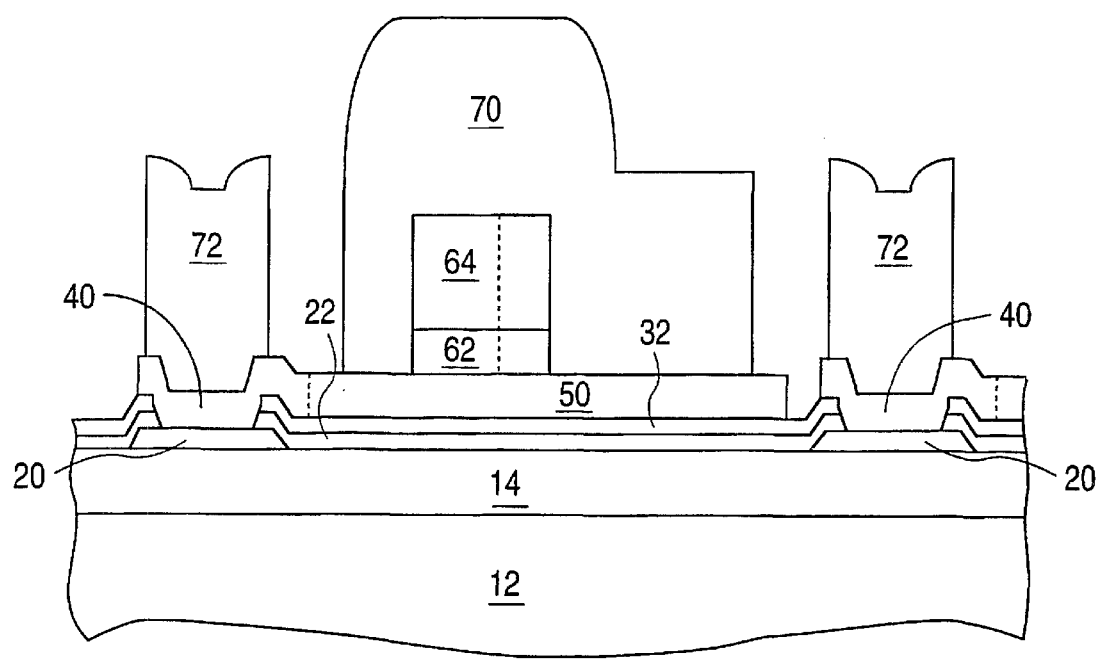
FIG. 7A shows a cross section view of the well release layer. This layer covers the upper electrode completely.
Figure 7B:
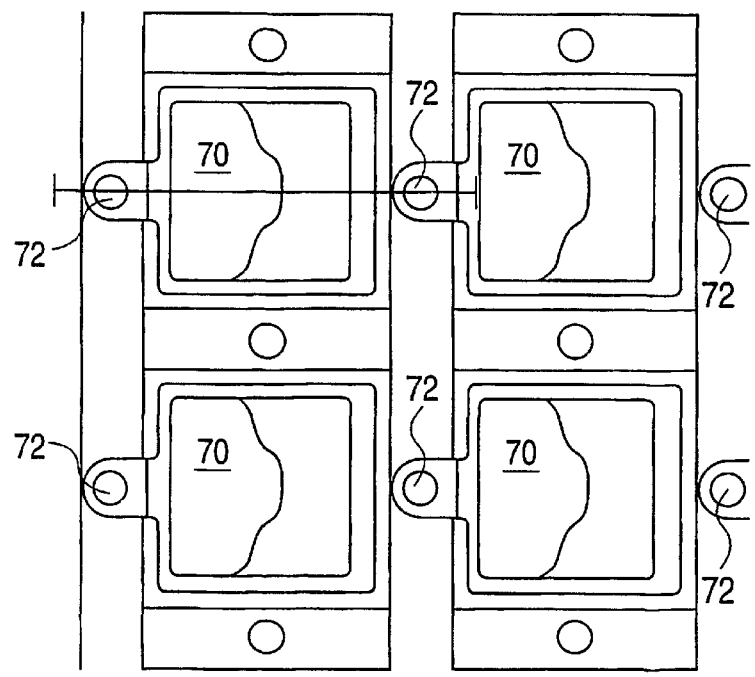
FIG. 7B is a plan view of the release layer, showing how the release layer fits completely atop the bottom electrode and how it covers the upper electrode structure completely.

The well release layer 70 is then photolithographically patterned and electroplated over the top of the upper electrode 60 as shown in FIG. 7a and 7b. Structures 72 are also electroplated on top of the lead vias 40 to allow for formation of a conductor that can establish electrical contact to subsequent formed layers. The function of the well release layer 70 is to define a volume of space over which the cantilever beam 100 will be suspended. The well release layer 70 is later sacrificially removed at the same time as the lower layer 62 in the laminated upper electrode 60. The shape and lateral dimensions of the well release layer 70 are such that it is large enough to allow etching through a chemical process, yet small enough that minimal debris can get into the well and between the upper layer 64 of the laminated upper electrode 60 and the lower electrode 50. The thickness of the well release layer 70 should preferably be greater than the thickness of the laminated upper electrode 60.

Figure 8:
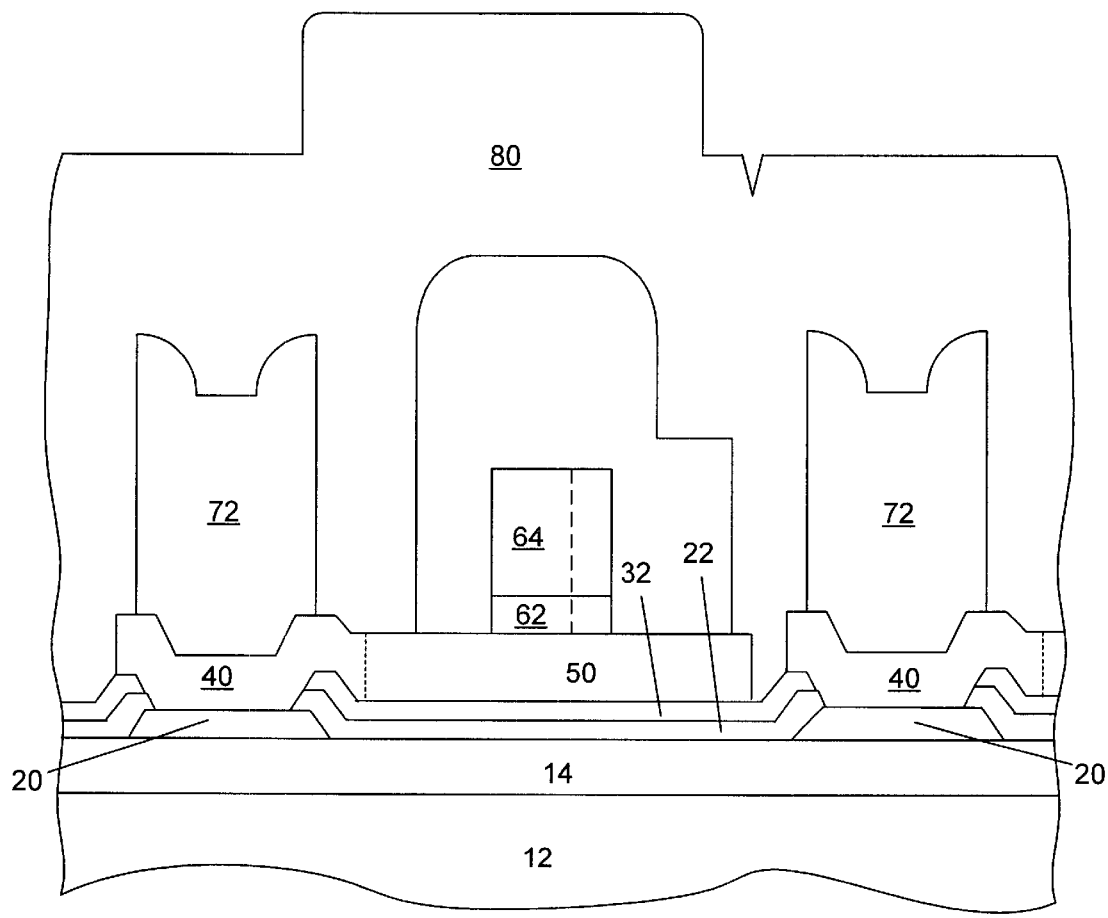
FIG. 8 is a cross section view of the planarizing insulator before it has been globally planarized.
Figure 9A:
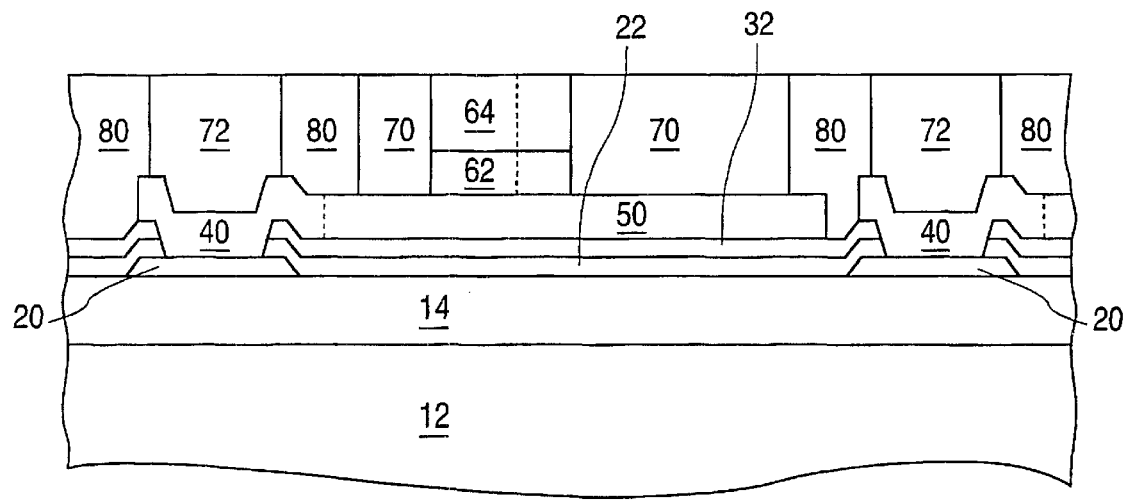
FIG. 9A is a cross section view of the device after the global planarization has taken place.
Figure 9B:
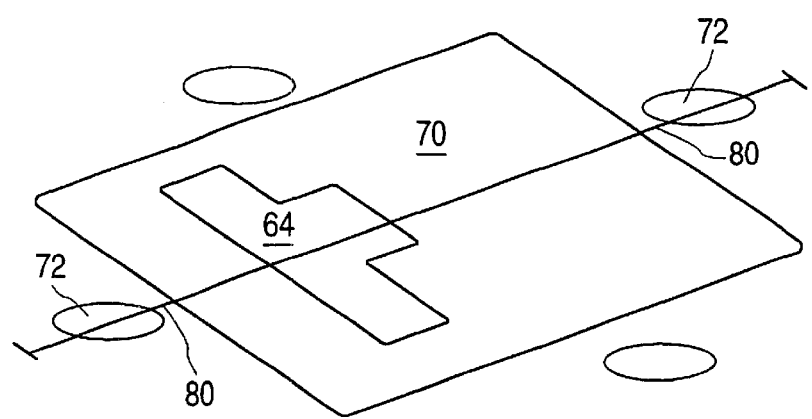
FIG. 9B is a perspective view of the top surface of the cell after global planarization.

A sheet film 80 of insulating material is then deposited over the entire wafer to a thickness greater than the thickness of the lower electrode 50 and the well release layer 70 combined, as shown in FIG. 8. This is called the planarizing insulator, and can be of various materials such as aluminum oxide, silicon nitride, silicon dioxide, etc. The wafer is then mechanically lapped using conventional lapping or chemical mechanical polishing (CMP) techniques such that the top of the wafer is now a flat surface, and the upper layer 64 of the laminated upper electrode 60 is just exposed, as shown in FIGS. 9a and 9b. Simultaneously, the conductor that fills the vias 40 is also exposed over the whole wafer surface.

Figure 10A:
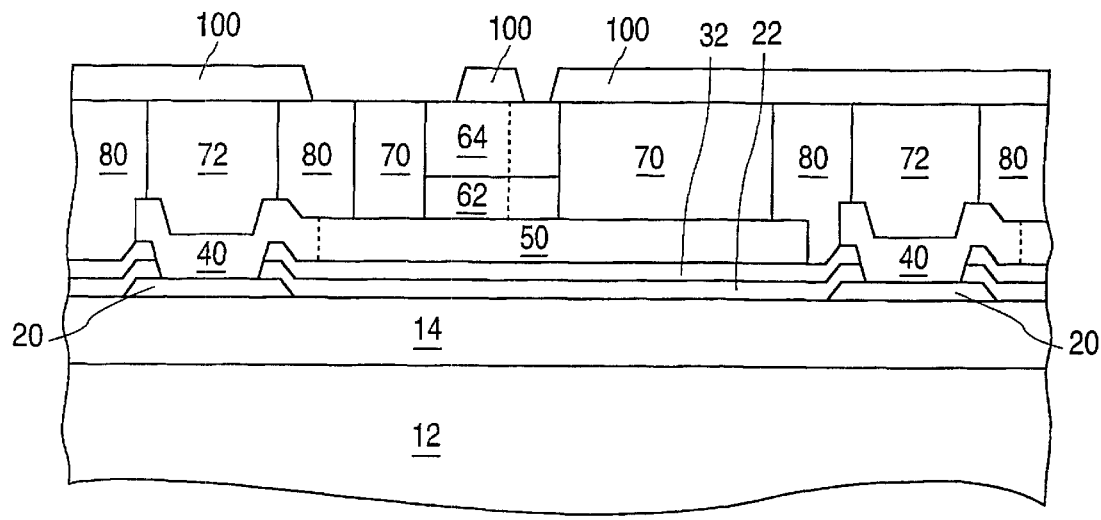
FIG. 10A is a cross section view of the completed cantilever beam.
Figure 10B:
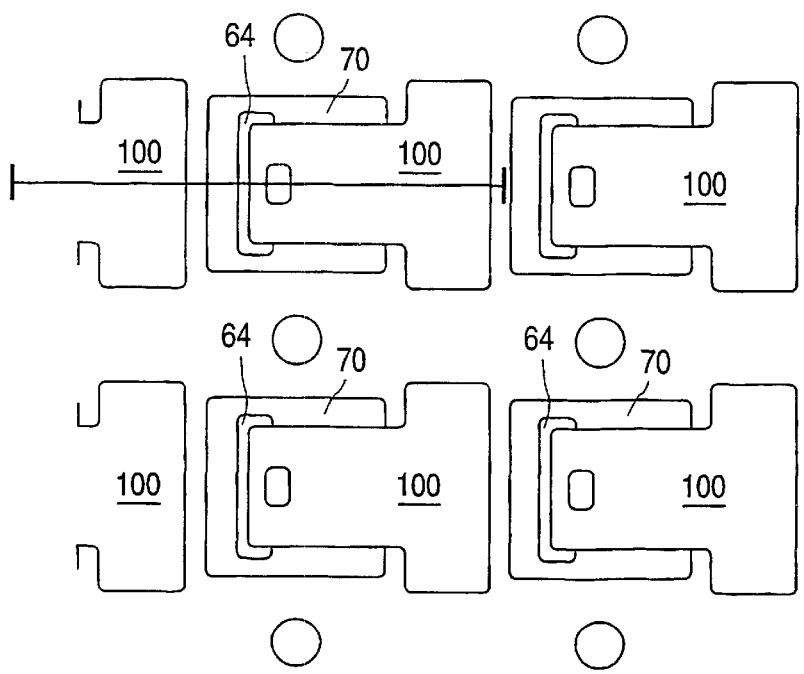
FIG. 10B is a plan view of the cantilever beam showing the general shape of the beam as it extends out over the release layer.

The cantilever beam 100 is constructed next. In order to do this, a sheet film of material can be deposited on the wafer with a thickness according to the beam design requirements. The shape of beam 100 is then defined through chemical or reactive etching or ion milling, as shown in FIGS. 10a and 10b. Alternatively, the beam pattern may be photolithographically defined prior to deposition using a liftoff stencil process that is well understood in the industry. If the beam 100 is to be made out of a polymer, it may be simply photolithographically patterned and then cured, either through a thermal, chemical or electron beam method. If the beam 100 is to be made out of a metal that can be electroplated, then it can be photolithographically patterned and electroplated.

Figure 11A:
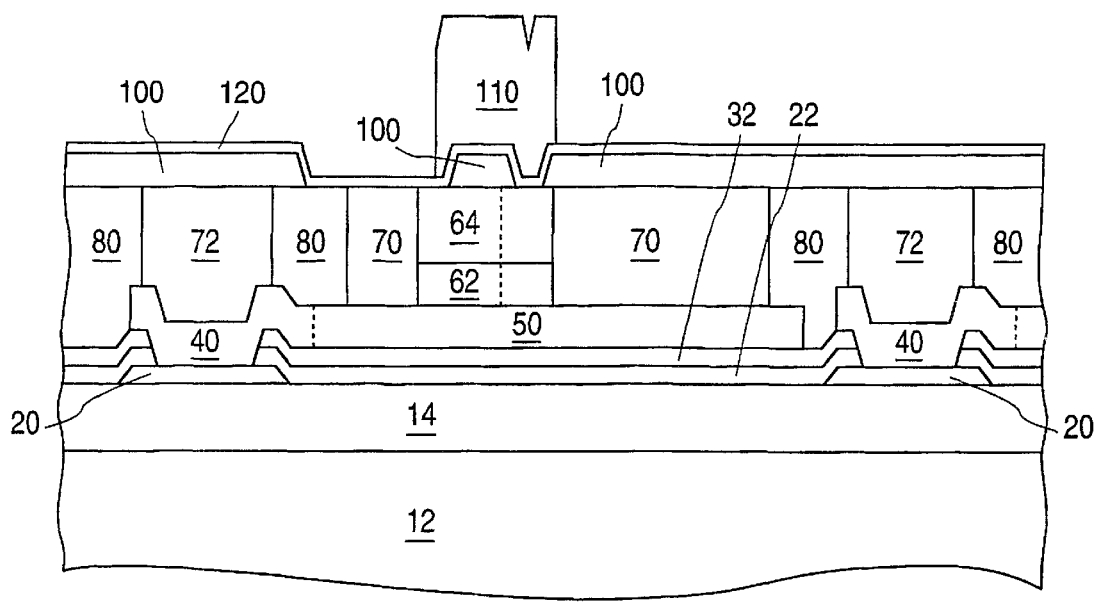
FIG. 11A is a cross section view of the top button and a thin conductor.
Figure 11B:
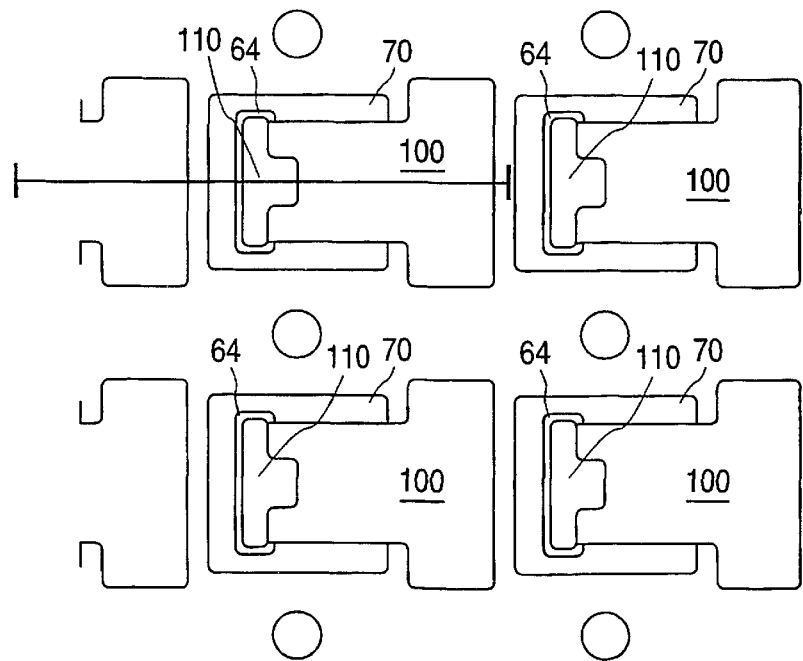
FIG. 11B is a plan view of the top button showing how the top button overlaps the hole in the end of the beam.

The top button structure 110 is then photolithographically patterned and electroplated over an applied conductive layer that will subsequently be patterned as the strap structure 120, as shown in FIGS. 11a and 11b (It is noted that FIG. 11B illustrates the button 110 in relation to the other components, excluding the layer 120). This feature serves the purpose of improving the adhesion of the upper electrode 60 to the cantilever beam 100 by encapsulating the beam 100 between the upper electrode 60 and the top button structure 110. The top button 110 also serves the purpose of providing a high point on the device which, when contacted by the ridge of a texture or a fingerprint, concentrates the load at the end of the cantilever beam 100. The thickness of this button structure 110 should be greater than the thickness of the lower layer 62 of the laminated upper electrode structure 60, which ensures that even under full deflection, the top button 110 will still be the highest point on the device. The top button 110 may be made of one of several different materials, with the consideration being that it is relatively insensitive to corrosion, and to oils and grease from the fingertip with which it repeatedly comes in contact. Gold or one of its alloys serves as a good material for the top button 110 as well. If a conductive material is used for the button 110, then it is preferably covered by an insulating layer (not shown) to ensure that there is no conductive path through the human finger to ground.

Figure 12A:
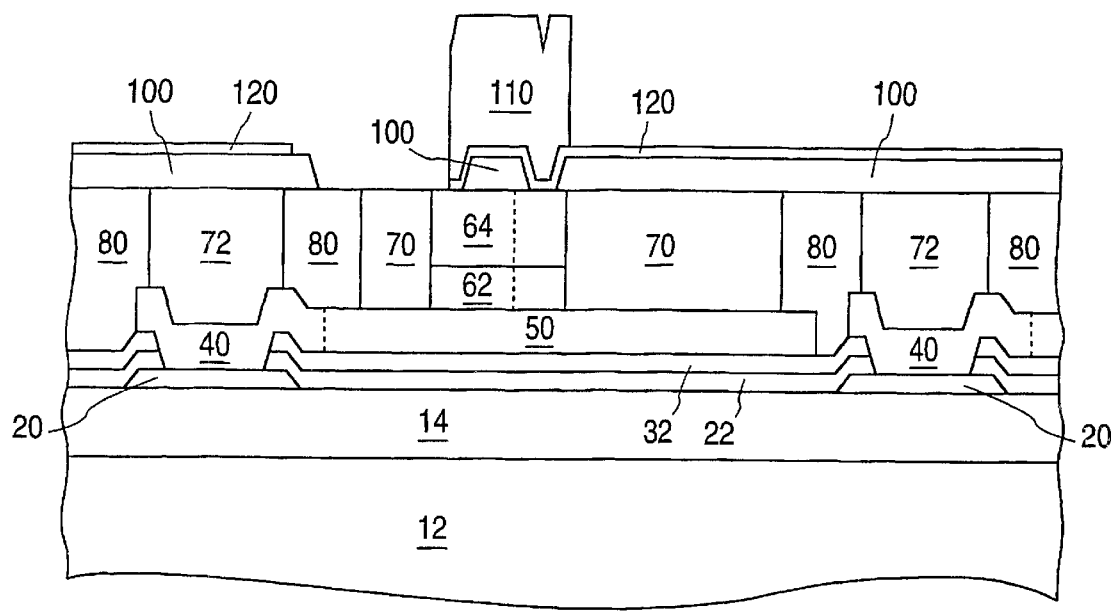
FIG. 12A is a cross section view of the thin conductor that connects the upper electrode to the leads after it has been photolithographically patterned.
Figure 12B:
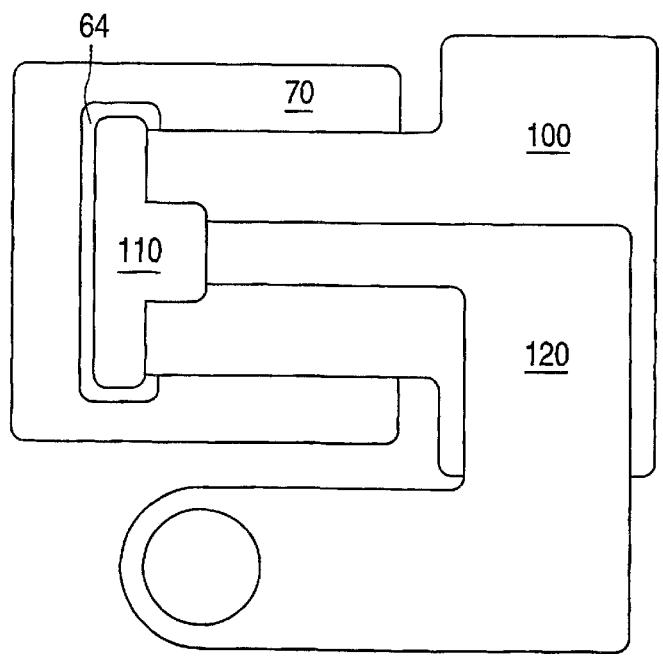
FIG. 12B is a plan view of the strap layer that connects the upper electrode to the leads.
Figure 13:
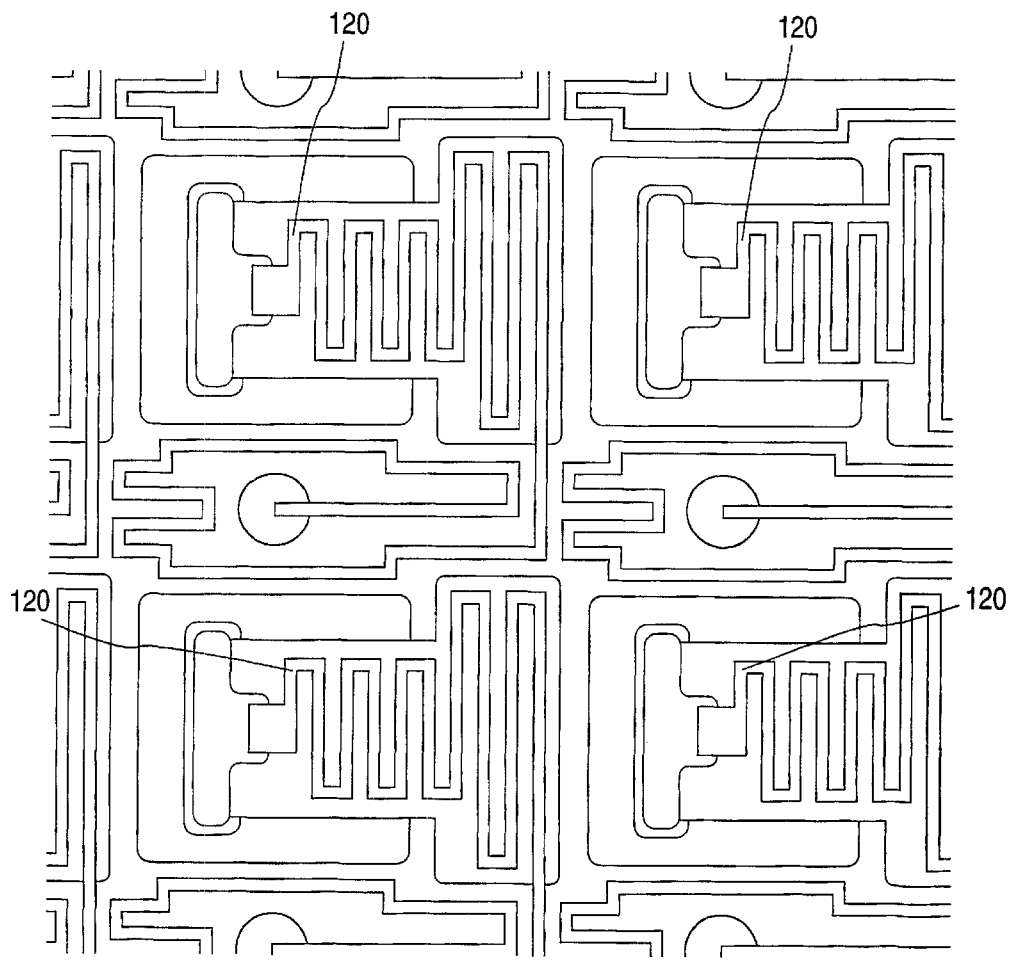
FIG. 13 is a plan view of an alternative design for the resistive strap shown in FIG. 12B.

Next, the strap structure 120 is photolithographically patterned and ion milled or chemically etched to provide an electrical connection between the upper electrode structure 60 and the lead array 122, as shown in FIGS. 12a and 12b and also in FIG. 13. The strap structure 120 is made of a conducting material with relatively high resistivity, whose thickness can be in the range of 0.005–5 $\mu$m thick. One function of the strap layer 120 is to electrically connect the upper electrode 60 to the lead structure 122. An additional function of the strap 120 is to provide an adequate series resistance with the switch such that the state of each switch can be determined using the method described below.

Figure 14:
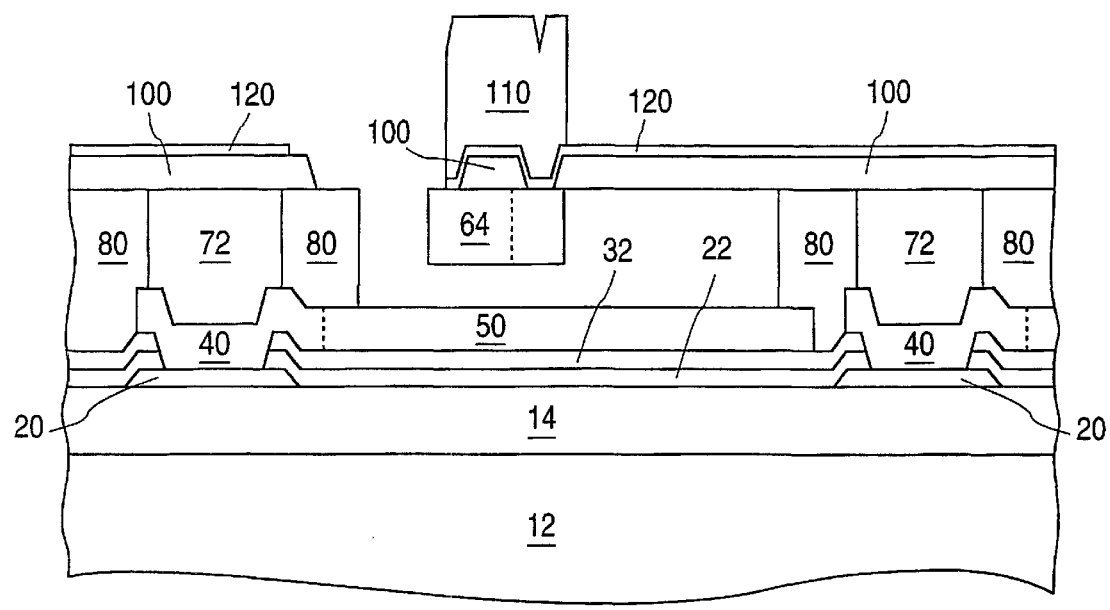
FIG. 14 is a cross section view of the pulse switch after the release layer and the lower layer of the laminated upper electrode have been etched away.

Finally, the well release layer 70 is photolithographically patterned again, and the well release layer 70 is chemically etched away along with the lower portion 62 of the laminated upper electrode 60. This action releases the cantilever beam structure 100, as shown in FIGS. 14, along with the attached upper electrode 60/top button structures 110, from the underlying material, leaving them suspended above the lower electrode 50.

Figure 15:
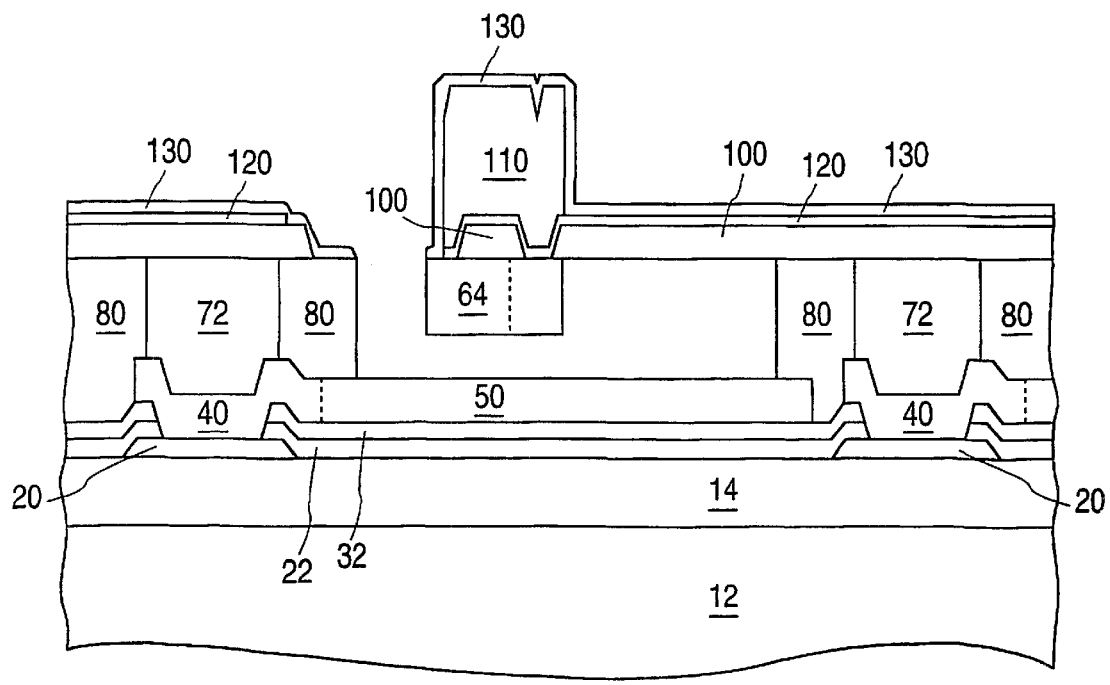
FIG. 15 is a cross section of a completed pulse switch with a protective insulator disposed thereover.

FIG. 15 illustrates an optional step of covering the device with an insulating layer 130 to provide insulation and abrasion resistance.

Although the device as described above is sufficient for the functioning of the fingerprint sensor by detecting the closing of individual switches, several different possibilities exist to enhance the performance of the device to make it more robust and reliable.

For example, a thin abrasion and wear resistant coating may be deposited over the entire sensor to increase the durability of the sensor. The abrasion resistant coating can be made of insulating or high resistivity materials such as diamond like carbon or silicon carbide or any other such coating that is well known in the art. This material can also have a surface energy tailored such that it is not conducive to picking up debris, oils from the fingertip, etc.

In addition, one can also deposit a thin layer of conducting, mechanically hard material directly on top of the lower electrode prior to deposition of the upper electrode, or between the two layers of the laminated upper electrode which is dissimilar from either the sacrificial well release layer or the lower or upper electrodes. This will ensure that during repeated contacts between the upper and lower electrodes combined with the passage of current, the upper and lower electrodes do not fuse together due to frictional forces, and also do not wear away.

Operation of the Sensor Array for Fingerprint Image Capture

A pressure based sensor comprising the individual switch as described above that can be used for fingerprint verification/identification, for example, will now be described in detail with reference to FIGS. 16A and 16B. Several sensors comprising the switches as described above are placed in an array of m rows by n columns on a substrate, with a very fine pitch, and connected to the conducting leads as described above. For example, when a finger is placed on the array, the ridges on the fingers (which are spaced at about 400–500 microns, and are therefore considerably wider than the sensor pitch in the array), apply a force on the sensors with which they come in contact. The cantilever beams on these sensors which experience the force from the ridges deflect in response to the stress in the manner described above, and contact the lower electrode, thus generating an electrical contact between the row and column corresponding to that switch. The sensors that fall between the ridges experience little or no stress, and thus continue to stay electrically open even in the presence of the fingerprint. In this way, one can generate a map of the contact points or the ridges on the fingerprint, and get an accurate reproduction of the fingerprint.

Figure 16A:
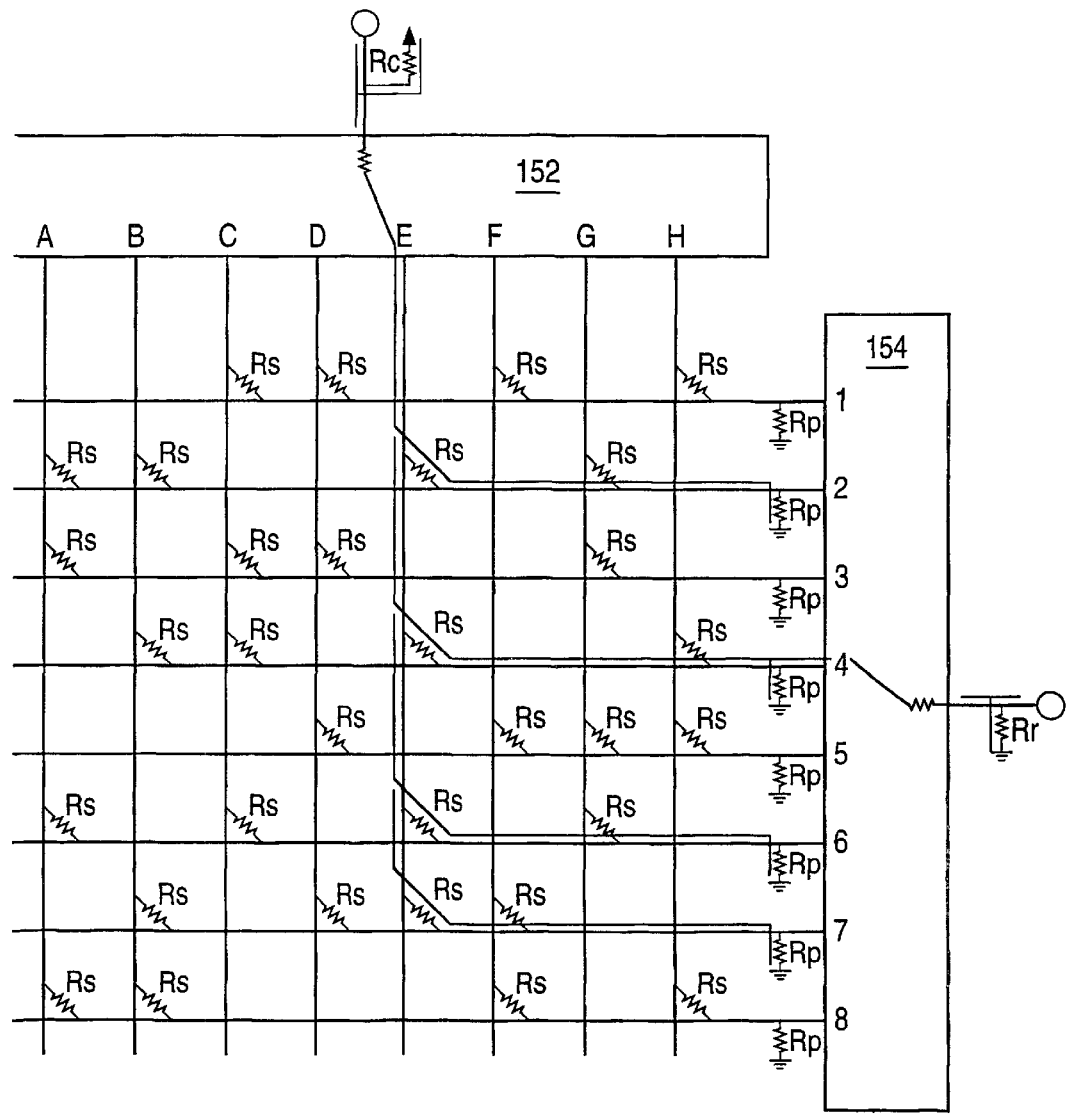
FIGS. 16A and 16B illustrate a portion of a switch matrix for a particular fingerprint.
Figure 16B:
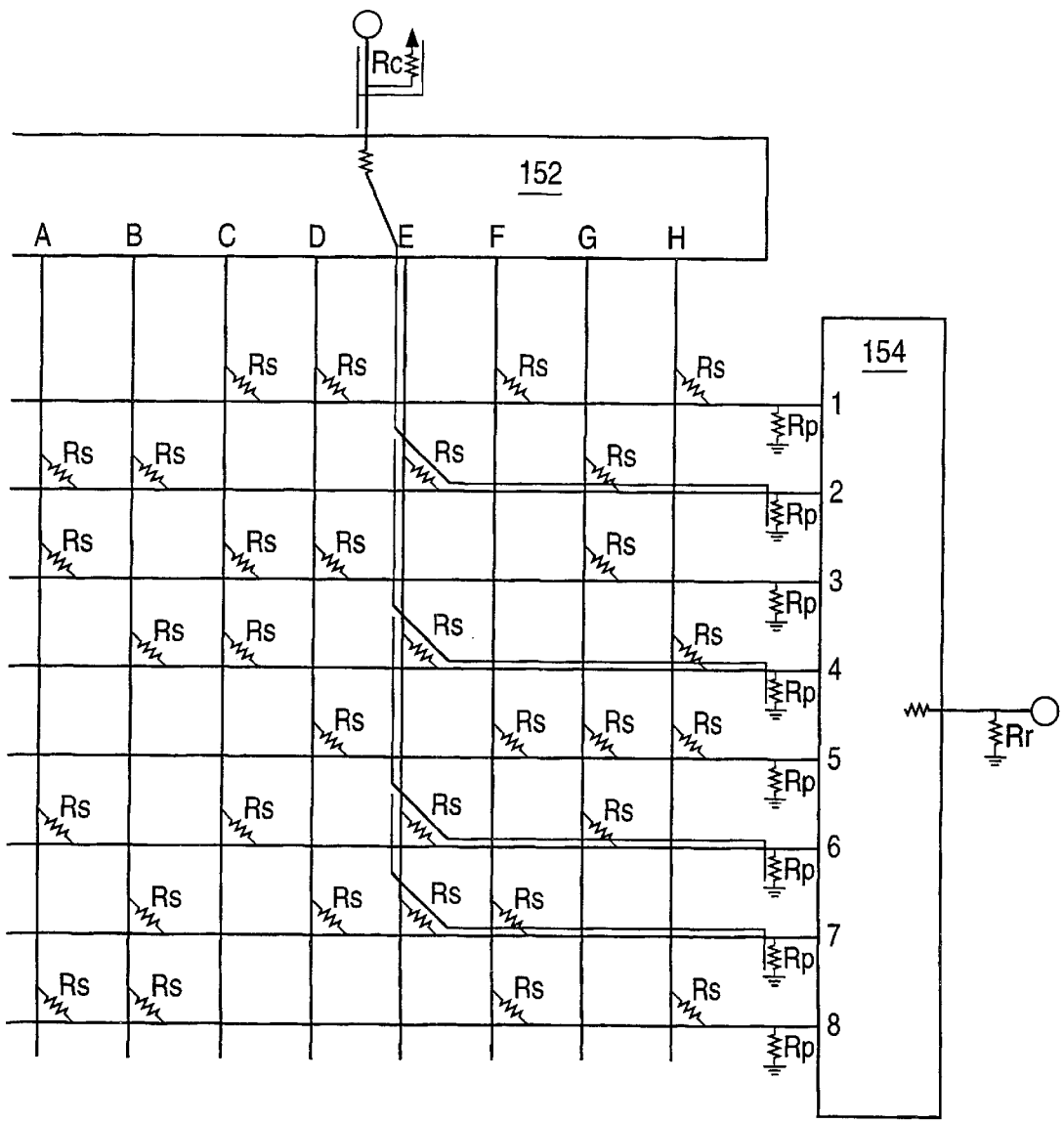

FIGS. 16A and 16B show a portion of the m rows by n columns, and those switches that are closed as a result of the finger being pressed on that portion of the m rows by n columns are designated by the conductive path Rs electrically connecting the column multiplexer 152 and the downstream multiplexer 154

To reliably detect whether any individual switch is either open or closed, there must be a significant difference in the voltage (or current) measured by the circuit for the closed case versus the open case. One way of ensuring this difference is to use pull-down resistors Rp, preferably a passive resistor, as illustrated in FIGS. 16A and 16B, and preferably of approximately 50–250 ohms, at the inputs of the downstream multiplexer 154 and to design-in large resistance producing devices, preferably passive resistors in the range of 5,000 ohms to 500,000 ohms, in series with each switch, as shown by the strap 120 as shown in FIGS. 12A, 12B and 13, described previously. An analysis of the closed and open switch cases is shown below. In these analyses a constant current source is used, sourcing from the column multiplexer 152 and sinking through the row or downstream multiplexer 154.

Closed Switch Case

Here the current that passes down the addressed column encounters a parallel network of closed and open switches. Those switches that are closed or open will depend upon the characteristics of the fingerprint that is pressuring the sensor array. The open switches provide essentially infinite impedance, so that only the closed switches need to be considered. The pull-down resistors Rp at the inputs to the row multiplexer 154 are selected such that each closed switch on the addressed column, including the switch on the addressed row, presents approximately the same resistance to the current. Thus, as shown in FIG. 16A, for the example shown, column E is addressed, and rows 2, 4, 6, and 7 each contain a closed switch Rs on the addressed column. The addressed row is row 4. Thus, switch E4 is being addressed. Under these conditions, the current is split evenly between all the closed switches Rs on the addressed column, in this case the closed switches Rs on rows 2, 4, 6, and 7. If there are n closed switches on the addressed column, then the current that flows through the switch being addressed can be approximated by I/n, where I is the total source current. Some of this current that makes its way to the addressed row is lost when it shunts back out through the closed switches on the addressed row. However, by making the switch resistance adequately high, this shunting can be reduced to a small fraction of the current that sinks through the multiplexer. Additionally, some of the current that was distributed throughout the fingerprint array does not sink through the various row pull-downs and makes its way back to the addressed row, increasing the current detected by the circuit.

Open Switch Case

Here, for the case referred to above and as illustrated in FIG. 16B, the addressed row (such as row 5 shown here) does not share any of the initial current that is split between the closed switches Rs on rows 2, 4, 6, and 7 on the addressed column E. The only current in the addressed row 5 is a portion of the current that does not sink through the various pull-down resistors Rp on the rows 2, 4, 6, and 7 with closed switches Rs on the addressed column E. This is the same current described for the closed switch case above that augments the initial I/n contribution.

The ratio of currents through the row multiplexer 154 for a closed versus an open switch can be considered to be the quality factor for detecting the state of any switch in the array. An equation that is a very good approximation of this ratio is:

$$I_{closed}/I_{open} = 1 + NX/n(1-X)$$

Where: $X = (R_{sw}/n + R_{sw}/n^2 + R_{pd}/n^2)/(R_{pd} + R_{sw}/n + R_{sw}/n^2 + R_{pd}/n^2)$ $R_{sw}$ = Resistance in series with each switch $R_{pd}$ = Pull-down resistance at inputs to the row multiplexer N = Total number of switches in any given row or column n = Average number of closed switches on any given row or column Some typical values for the parameters in the above equations are:

$R_{sw}$ = 60,000 Ω

$R_{pd}$ = 200 Ω

N = 300 Switches n = 150 Switches

X = 0.668 which yields a current ratio or quality factor of: $I_{closed}/I_{open}$ = 5.02

This ratio is large enough to provide resolution in distinguishing between a closed and an open switch.

Because the cantilever beams can be made as small as 1–2 microns in length, the lateral resolution of each sensor cell can be as small as 5 microns. However, in practice, such a good resolution is typically not required for a fingerprint image. Moreover, as the sensor pitch decreases, the processing time for the image increases, since the number of sensors in the image increases as well.

As discussed above, the column multiplexer 152 and row multiplexer 154 shown in FIGS. 16A and 16B are used to individually address each of the switches in the matrix, and thereby determine the state of each switch so that the fingerprint can be determined therefrom. Such multiplexers and the manner of causing the addressing of each switch are well known, and thus a detailed description thereof is not necessary for an understanding of the present invention.

In accordance with an aspect of a method of fingerprint identification/verification in accordance with the invention, however, to determine whether there is a stress on a particular sensor, a baseline is first established with no finger on the sensor, where the "quiescent" impedance of each sensor is measured. In principle, all the sensors should have infinite impedance at this state, since the switches are electrically "open" in the quiescent state. However, in practice, it is possible that a few of the sensors are "closed" due to processing errors, or undue deflection of some cantilever beams even under the absence of stress that causes the beam to contact the lower electrode. The impedance measurements of each sensor are then repeated with the finger on the sensor, and the sensors that have changed "state" from electrically "open" to electrically "closed" are then recorded. This information is then mapped together for the entire sensor array to obtain an image of the fingerprint. The method of scanning, providing power to each element, conversion of the different analog pulses at each different switch into digital signals etc are well known.

Note that the baseline can be established either immediately prior to or immediately following the imaging of the fingerprint. An advantage of the method of this invention is that it always establishes a reference value, which eliminates the effect of ambient temperature, humidity, stress, etc. One can also use this to eliminate individual bad sensors that are electrically "closed" even prior to the application of the fingertip. The prior art, using capacitive or optical means are unable to obtain such a reference each time a measurement is taken, because they depend on the presence of a finger to obtain a reading each time.

Alternate Design Considerations

Provided below are certain alternative design considerations that can be used with the sensor as has been described.

Fixed End Beam or Membrane vs. Cantilever Beam

The fixed beam or membrane designs are inherently stiffer than the cantilever and the design of the beam or membrane geometry needs to account for this added stiffness. In these embodiments, the upper electrode is centrally located on a beam, which spans the well above the lower electrode, or is centrally located on a membrane that stretches over the entire well above the lower electrode. In the case of the membrane the cavity or the well is essentially a sealed space which separates the lower electrode from the upper electrode which is situated at the center of the membrane. The button is also located in the center of the beam or the membrane to provide for the maximum possible deflection from the force applied by the finger. In all other respects this device is otherwise essentially the same as the cantilever beam design.

Open/Close vs. Close/Open

The preferred embodiment is what is referred to as a "Normally Open" switch. An alternative design has the contacts "Normally Closed". This design requires changing some of the processing sequences to allow the beam spring to close the switch upon removal of the sacrificial release layer. This design has the advantage that only the smallest deflection is required to open the switch, reducing the deflection requirements inherent in the "Normally Open" design. This design also reduces the likelihood of contamination building up between the contacts, which can reduce the reliability of the switch.

Alternate Location of Button

Another embodiment locates the top button structure closer to the end of the cantilever beam than the upper electrode. In the preferred embodiment, when the upper electrode makes contact with the lower electrode, any additional force would tend to flatten out the end of the beam, changing the shape of the beam into a sideways "S". This shape could stress the beam in damaging ways, and location of the button closer to the end of the beam prevents this from happening.

Switch or Cell

The present invention has described using a large resistance in series with each switch and a pull-down resistance associated with each row or column in order to allow discrimination of the state of the switch. In particular, the usage of a passive resistance in series with each switch and a passive pull-down resistance in each row or column has been described. It is also contemplated that a pressure sensor array that is not based upon a "switch" that changes from an open to a closed state and vice versa, but instead a "cell" that changes from one state to another, such as a silicon based or Giant MagnetoResistive sensor that changes from one resistance state to another resistance state, which resistance states can be discriminated, is within the scope of the present invention. Further, it is also contemplated that a non-pressure based sensor, such as an imaging sensor with each element sensing a different portion of impinging light (such as charge coupled device) or an infrared sensor will also benefit from being used in conjunction with the resistance in series (and particularly a passive resistance) with each sensor element and a pull-down resistance series (and particularly a passive pull-down resistance) in each row or column.

Although the present invention has been described in detail with reference to the preferred embodiments thereof, those skilled in the art will appreciate that various substitutions and modifications can be made to the examples described herein while remaining within the spirit and scope of the invention as defined in the appended claims.

What is claimed is:

1. An integrated circuit chip sensor for sensing a texture that has a plurality of ridges and
   a plurality of valleys comprising:
   a substrate containing only passive circuit elements therein and thereon;
   a plurality of row lines;
   a plurality of column lines
   a plurality of switches disposed on the substrate in an array such that each row line and each column line is connected to a plurality of sensors, each switch including:
   a lower electrode electrically connected to one of row lines;
   an upper electrode spaced apart from said lower electrode and electrically connected to one of the column lines; and
   a flexible support disposed over said upper electrode, wherein a ridge of said texture causes flexure of said flexible support and thereby results in movement of said upper electrode and a change in a state of electrical contact between said upper electrode and said lower electrode and wherein a valley of said texture disposed over another of said switches will not result in flexure of said flexible support and said change in state of electrical contact between said upper electrode and said lower electrode associated with said another switch.

2. An integrated sensor according to claim 1 wherein a plurality of switches will be located between adjacent ridges of the texture.

3. An integrated sensor according to claim 1 wherein a passive resistance is connected in series with each switch to one of one of the row lines and one of the column lines on which that switch is located.

4. An integrated sensor according to claim 3 wherein each resistance in series is a passive resistor.

5. An integrated sensor according to claim 4 wherein each passive resistor is between about 5,000 and 500,000 ohms.

6. An integrated sensor according to claim 3 wherein each passive resistance in series is between about 5,000 and 500,000 ohms.

7. An integrated sensor according to claim 3 further including a pull-down passive resistance connected at each of the downstream rows or columns to a lower electrical potential that assists in providing discrimination of said change in state between a closed state and an open state.

8. An integrated sensor according to claim 7 wherein a substantially uniform current passes through each of a plurality of closed switches in the given row line or column line irrespective of the number of the plurality of closed switches in the given row line or column line.

9. An integrated sensor according to claim 7 further including a column multiplexer and a row multiplexer connected to the integrated sensor, the column multiplexer connected to each of the column lines and the row multiplexer connected to each of the row lines.

10. An integrated sensor according to claim 7 wherein each pull-down passive resistance is between about 50 and 250 ohms.

11. An integrated sensor according to claim 7 wherein each pull-down passive resistance is a passive resistor.

12. An integrated sensor according to claim 11 wherein each passive resistor is between about 50 and 250 ohms.

13. An integrated sensor according to claim 12 wherein each resistance in series is between about 5,000 and 500,000 ohms.

14. An integrated circuit chip sensor for sensing a texture that has a plurality of ridges and a plurality of valleys comprising:
   a substrate containing only passive circuit elements therein and thereon;
   a plurality of row lines;
   a plurality of column lines
   a plurality of passive switches disposed on the substrate in an array such that each row line and each column line is connected to a plurality of sensors, each passive switch including:
   a lower electrode electrically connected to one of row lines;
   an upper electrode spaced apart from said lower electrode and electrically connected to one of the column lines;

a flexible support disposed over said upper electrode, where in a ridge of said texture causes flexure of said flexible support and thereby results in movement of said upper electrode and a change in a state of electrical contact between said upper electrode and said lower electrode and wherein a valley of said texture disposed over another of said switches will not result in flexure of said flexible support and said change in state of electrical contact between said upper electrode and said lower electrode associated with said another switch; and a button disposed over each of said flexible supports, wherein said ridge of said texture will cause flexure of said flexible support associated with said one button and said valley of said texture disposed above another of said buttons will not cause substantial flexure of said flexible support associated with said another button.

15. An integrated sensor according to claim 14 wherein a height of said button is greater than a distance that said upper electrode is spaced apart from said lower electrode.

16. An integrated sensor according to claim 14 further including a resistance is connected in series with each switch to one of one of the row lines and one of the column lines on which that switch is located.

17. An integrated sensor according to claim 16 wherein each resistance in series is between about 5,000 and 500,000 ohms.

18. An integrated sensor according to claim 16 wherein each resistance in series is obtained using a passive resistor.

19. An integrated sensor according to claim 18 wherein each passive resistor is between about 5,000 and 500,000 ohms.

20. An integrated sensor according to claim 18 further including a pull-down passive resistor connected at each of the downstream rows or columns to a lower electrical potential that assists in providing discrimination of said change in state between a closed state and an open state.

21. An integrated sensor according to claim 20 further including a column multiplexer and a row multiplexer connected to the integrated sensor, the column multiplexer connected to each of the column lines and the row multiplexer connected to each of the row lines.

22. An integrated sensor according to claim 21 wherein each pull-down passive resistor is between about 50 and 250 ohms.

23. An integrated sensor according to claim 22 wherein each passive resistor is between about 5,000 and 500,000 ohms.

24. An integrated sensor according to claim 16 further including a pull-down passive resistance connected at each of the downstream rows or columns to a lower electrical potential that assists in providing discrimination of said change in state between a closed state and an open state.

25. An integrated sensor according to claim 24 wherein a substantially uniform current passes through each of a plurality of closed switches in the given row line or column line irrespective of the number of the plurality of closed switches in the given row line or column line.

26. An integrated sensor according to claim 24 further including a column multiplexer and a row multiplexer connected to the integrated sensor, the column multiplexer connected to each of the column lines and the row multiplexer connected to each of the row lines.

27. An integrated sensor according to claim 26 wherein each pull-down passive resistance is between about 50 and 250 ohms.

28. An integrated sensor according to claim 27 wherein each resistance in series is between about 5,000 and 500,000 ohms.

29. An apparatus according to claim 14 further including an insulating layer disposed over the upper electrode and button to provide insulation and abrasion resistance.

30. An integrated sensor according to claim 1 wherein each switch is in a normally open state.

31. An integrated sensor according to claim 1 wherein each switch is in a normally closed state.

32. An integrated sensor according to claim 1 wherein the flexible support is a cantilever beam.

33. An apparatus according to claim 1 further including an insulating layer disposed over the upper electrode to provide insulation and abrasion resistance.

34. An integrated circuit chip sensor for sensing a fingerprint that has a plurality of ridges and a plurality of valleys comprising:

a substrate;

a plurality of row lines;

a plurality of column lines;

a plurality of switches capable of being in either a normally open or a normally closed state disposed on the substrate in an array such that each row line and each column line is connected to a plurality of sensors; and a plurality of resistance producing devices, a different one of said resistance producing devices being connected in series with each switch to one of one of the row lines and one of the column lines on which that switch is located.

35. An integrated sensor according to claim 34 wherein each resistance in series is a passive resistor.

36. An integrated sensor according to claim 35 wherein each passive resistor is between about 5,000 and 500,000 ohms.

37. An integrated sensor according to claim 34 further including a pull-down passive resistor connected at each of the downstream rows or columns to a lower electrical potential that assists in providing discrimination of a change in state between said closed state and said open state.

38. An integrated sensor according to claim 37 wherein a substantially uniform current passes through each of a plurality of closed switches in the given row line or column line irrespective of the number of the plurality of closed switches in the given row line or column.

39. An integrated sensor according to claim 37 further including a column multiplexer and a row multiplexer connected to the integrated sensor, the column multiplexer connected to each of the column lines and the row multiplexer connected to each of the row lines.

40. An integrated sensor according to claim 37 wherein each pull-down passive resistor is between about 50 and 250 ohms.

41. An integrated sensor according to claim 34 further including a pull-down resistance connected at each of the downstream rows or columns to a lower electrical potential that assists in providing discrimination of a change in state between said closed state and said open state.

42. An integrated sensor according to claim 41 wherein a substantially uniform current passes through each of a plurality of closed switches in the given row line or column line irrespective of the number of the plurality of closed switches in the given row line or column.

43. An integrated sensor according to claim 41 further including a column multiplexer and a row multiplexer connected to the integrated sensor, the column multiplexer connected to each of the column lines and the row multiplexer connected to each of the row lines.

44. An integrated sensor according to claim 41 wherein each pull-down resistance is between about 50 and 250 ohms.

45. An integrated sensor according to claim 41 wherein each resistance in series is a passive resistor.

46. An integrated sensor according to claim 45 wherein each passive resistor is between about 5,000 and 500,000 ohms.

47. An integrated sensor according to claim 46 wherein each pull-down passive resistance is between about 50 and 250 ohms.

48. An integrated sensor according to claim 34 wherein each switch is in a normally open state.

49. An integrated sensor according to claim 34 wherein each switch is in a normally closed state.

50. An integrated sensor according to claim 34 wherein the substrate is one of silicon and glass.

51. A method of detecting a texture comprising the steps of:
   depressing the texture over a plurality of switches formed within a determined area, each switch containing a support, an upper electrode and a lower electrode spaced apart from the upper electrode, and wherein associated with each of the switches is a passive resistance producing device, each of said passive resistance producing devices being connected in series with a different switch to one of one of row lines and one of column lines of an array on which that switch is located, said step of depressing causing:
      substantial movement of a first group of the supports associated with a first group of switches, the substantial movement being caused as a result of contact with a ridge of the texture and the correspondingly located switch, thereby resulting in a change of state in each of the switches in the first group; and
      insubstantial movement of a second group of the supports associated with a second group of switches that is different from the first group of switches, the insubstantial movement being caused as a result of a valley of the texture being disposed over the correspondingly located switch, thereby resulting in no change of state in each of the switches in the second group.

52. A method according to claim 51 wherein the texture is a human fingerprint, and the plurality of switches are arranged in an array such that the step of depressing will cause a plurality of adjacent switches to be within the second group of switches, thereby corresponding to a valley between adjacent ridges of the human fingerprint.

53. The method according to claim 51 further including the step of passively addressing each of the switches to obtain a signal for each of the switches to allow capture of the texture.

54. A method according to claim 53 further including the step of measuring a steady state either prior to application of the texture or after the removal of the texture.

55. A method according to claim 54 wherein the step of using the signals further includes the step of obtaining a difference measurement between the steady state and a state where the texture is being depressed on the switches in order to determine which switches in the array form the first group of switches and which of the switches in the array form the second group of switches.

56. A method according to claim 53 wherein the step of depressing causes a plurality of switches that are disposed between adjacent ridges of the fingerprint to remain in the same state.

57. A method of detecting a texture comprising the steps of:
   depressing the texture over a plurality of switches formed within a determined area, each switch containing a support, an upper electrode and a lower electrode spaced apart from the upper electrode, and wherein associated with each of the switches is a passive resistance producing device, each of said passive resistance producing devices being connected in series with a different switch to one of one of row lines and one of column lines of an array on which that switch is located, said step of depressing causing:
   substantial movement of a first group of the supports associated with a first group of switches, the substantial movement being caused as a result of contact with a ridge of the texture and the correspondingly located switch, thereby resulting in a change of state in each of the switches in the first group; and
   insubstantial movement of a second group of the supports associated with a second group of switches that is different from the first group of switches, the insubstantial movement being caused as a result of a valley of the texture being disposed over the correspondingly located switch, thereby resulting in no change of state in each of the switches in the second group;
   wherein the texture is a human fingerprint, and the plurality of switches are arranged in an array such that the step of depressing will cause a plurality of adjacent switches to be within the second group of switches, thereby corresponding to a valley between adjacent ridges of the human fingerprint; and
   wherein the step of determining causes a current having a first range for each of those switches in the first group and a current having a second range that does not overlap the first range for each of those switches in the second group.

58. A method according to claim 52 wherein associated with each of the switches is a resistance producing device, each of said resistance producing devices being connected in series with a different switch to one of one of the row lines and one of the column lines on which that switch is located.

59. A method according to claim 57 wherein the step of depressing the human finger over a plurality of switches results in the change in state of the first group of switches and a substantially uniform current passes through each of first group of switches irrespective of the number of the plurality of closed switches in the given row line or column line.

60. A method of detecting a texture comprising the steps of:
   depressing the texture over a plurality of switches formed within a determined area, each switch containing a support, an upper electrode and a lower electrode spaced apart from the upper electrode, and wherein associated with each of the switches is a passive resistance producing device, each of said passive resistance producing devices being connected in series with a different switch to one of one of row lines and one of column lines of an array on which that switch is located, said step of depressing causing:
      substantial movement of a first group of the supports associated with a first group of switches, the substantial movement being caused as a result of contact with a ridge of the texture and the correspondingly located switch, thereby resulting in a change of state in each of the switches in the first group;

insubstantial movement of a second group of the supports associated with a second group of switches that is different from the first group of switches, the insubstantial movement being caused as a result of a valley of the texture being disposed over the correspondingly located switch, thereby resulting in no change of state in each of the switches in the second group;

determining which switches in the array form the first group of switches and which of the switches in the array form the second group of switches; and using the determined state of the first group of switches and the second group of switches to capture the texture.

61. A method according to claim 60 further including the step of measuring a steady state either prior to application of the texture or after the removal of the texture.

62. A method according to claim 61 wherein the step of determining further includes the step of obtaining a difference measurement between the steady state and a state where the texture is being depressed on the switches in order to determine which switches in the array form the first group of switches and which of the switches in the array form the second group of switches.

63. An apparatus according to claim 1 further including means for passively addressing each of the switches connected to the integrated sensor to obtain a signal for each of the switches to allow capture of the texture.

64. An apparatus according to claim 63 wherein each of the plurality of switches has a different flexible support disposed over the upper electrode.

65. An apparatus according to claim 64 wherein each of the switches is adapted to provide the change in the state of electrical contact by configuring the upper electrode to directly contact the lower electrode.

66. An apparatus according to claim 63 wherein each of the switches is adapted to provide the change in the state of electrical contact by configuring the upper electrode to directly contact the lower electrode.

67. An apparatus according to claim 1 wherein each of the plurality of switches has a different flexible support disposed over the upper electrode.

68. An apparatus according to claim 67 wherein each of the switches is adapted to provide the change in the state of electrical contact by configuring the upper electrode to directly contact the lower electrode.

69. An apparatus according to claim 1 wherein each of the switches is adapted to provide the change in the state of electrical contact by configuring the upper electrode to directly contact the lower electrode.

70. An apparatus according to claim 34 further including means for addressing each of the switches connected to the integrated circuit chip sensor to obtain a signal for each of the switches to allow capture of the texture.

71. An apparatus according to claim 70 wherein each of the plurality of switches has a different flexible support disposed over the upper electrode.

72. An apparatus according to claim 71 wherein each of the switches is adapted to provide the change in the state of electrical contact by configuring the upper electrode to directly contact the lower electrode.

73. An apparatus according to claim 70 wherein each of the switches is adapted to provide the change in the state of electrical contact by configuring the upper electrode to directly contact the lower electrode.

74. An apparatus according to claim 34 wherein each of the plurality of switches has a different flexible support disposed over the upper electrode.

75. An apparatus according to claim 74 wherein each of the switches is adapted to provide the change in the state of electrical contact by configuring the upper electrode to directly contact the lower electrode.

76. An apparatus according to claim 34 wherein each of the switches is adapted to provide the change in the state of electrical contact by configuring the upper electrode to directly contact the lower electrode.

77. A method of detecting a texture comprising the steps of:

depressing the texture over a plurality of switches formed within a determined area, each switch containing a support, an upper electrode and a lower electrode spaced apart from the upper electrode, and wherein associated with each of the switches is a passive resistance producing device, each of said passive resistance producing devices being connected in series with a different switch to one of one of the row lines and one of the column lines on which that switch is located, said step of depressing causing:

substantial movement of a first group of the supports associated with a first group of switches, the substantial movement being caused as a result of contact with a ridge of the texture and the correspondingly located switch, thereby resulting in a change of state in each of the switches in the first group due to direct contact of the upper electrode with the lower electrode; and insubstantial movement of a second group of the supports associated with a second group of switches that is different from the first group of switches, the insubstantial movement being caused as a result of a valley of the texture being disposed over the correspondingly located switch, thereby resulting in no change of state in each of the switches in the second group.

78. A method according to claim 77 further including the step of passively addressing each of the switches to obtain a signal for each of the switches to allow capture of the texture.

79. A method according to claim 78 further comprising the steps of:

using the signals to capture the fingerprint associated with the finger that was depressed.

80. A method according to claim 79 further including the step of measuring a steady state either prior to application of the texture or after the removal of the texture.

81. A method according to claim 80 wherein the step of using the signals further includes the step of obtaining a difference measurement between the steady state and a state where the texture is being depressed on the switches in order to determine which switches in the array form the first group of switches and which of the switches in the array form the second group of switches.

82. A method according to claim 77 wherein the texture is a human fingerprint, and the plurality of switches are arranged in an array such that the step of depressing will cause a plurality of adjacent switches to be within the second group of switches, thereby corresponding to a valley between adjacent ridges of the human fingerprint.

83. A method according to claim 53 further comprising the steps of:

using the signals to capture the fingerprint associated with the finger that was depressed.

84. An integrated sensor according to claim 1 wherein the flexible support includes a conductive membrane.

85. An integrated sensor according to claim 84 further including a button disposed over a top surface of the conductive membrane.

86. An integrated sensor according to claim 85 wherein the button is disposed over a center portion of the conductive membrane.

87. An integrated sensor according to claim 86 wherein the upper electrode spaced apart from the lower electrode creates a cavity, and wherein the cavity is an essentially sealed space.

88. An integrated sensor according to claim 85 wherein the upper electrode spaced apart from the lower electrode creates a cavity, and wherein the cavity is an essentially sealed space.

89. An integrated sensor according to claim 84 wherein a spacing between the plurality of switches is less than 400 microns.

90. An integrated sensor according to claim 1 wherein a spacing between the plurality of switches is less than 400 microns.

91. An integrated sensor according to claim 14 wherein the flexible support includes a conductive membrane.

92. An integrated sensor according to claim 91 wherein the button is disposed over a center portion of the conductive membrane.

93. An integrated sensor according to claim 92 wherein the upper electrode spaced apart from the lower electrode creates a cavity, and wherein the cavity is an essentially sealed space.

94. An integrated sensor according to claim 91 wherein the upper electrode spaced apart from the lower electrode creates a cavity, and wherein the cavity is an essentially sealed space.

95. An integrated sensor according to claim 91 wherein a spacing between the plurality of switches is less than 400 microns.

* * * * *